United States Patent
Zhu

(10) Patent No.: US 11,282,129 B2
(45) Date of Patent: Mar. 22, 2022

(54) ORDER PROCESSING AND ORDER-PICKING TASK PROCESSING METHOD, SERVER, ORDER-PICKING TERMINAL, AND ELECTRONIC PRICE TAG

(71) Applicant: Alibaba Group Holding Limited, Grand Cayman (KY)

(72) Inventor: Yu Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 303 days.

(21) Appl. No.: 16/022,478

(22) Filed: Jun. 28, 2018

(65) Prior Publication Data

US 2019/0005567 A1  Jan. 3, 2019

(30) Foreign Application Priority Data

Jun. 29, 2017  (CN) .......................... 201710512817.0

(51) Int. Cl.
| | |
|---|---|
| G06Q 30/06 | (2012.01) |
| G06Q 20/12 | (2012.01) |
| G06Q 20/32 | (2012.01) |
| G06Q 20/14 | (2012.01) |
| G06Q 20/20 | (2012.01) |
| G07F 17/40 | (2006.01) |
| G07G 1/00 | (2006.01) |
| G07F 9/00 | (2006.01) |

(52) U.S. Cl.
CPC ......... *G06Q 30/0635* (2013.01); *G06Q 20/12* (2013.01); *G06Q 20/145* (2013.01); *G06Q 20/203* (2013.01); *G06Q 20/3278* (2013.01); *G06Q 30/0641* (2013.01); *G07F 9/002* (2020.05); *G07F 17/40* (2013.01); *G07G 1/009* (2013.01); *G07G 1/0036* (2013.01)

(58) Field of Classification Search
CPC .......... G06Q 30/0635; G06Q 30/0639; G06Q 10/087; H04W 4/33; B65G 1/1573
USPC .......................................................... 705/28
See application file for complete search history.

(56) References Cited

U.S. PATENT DOCUMENTS

| | | | | |
|---|---|---|---|---|
| 5,812,986 | A | * 9/1998 | Danelski ................. | G06F 3/147 705/22 |
| 7,221,276 | B2 | * 5/2007 | Olsen, III ............... | B07C 7/005 340/572.1 |

(Continued)

*Primary Examiner* — Luna Champagne
(74) *Attorney, Agent, or Firm* — Lee & Hayes, P.C.

(57) ABSTRACT

An order information processing method including receiving order information, the order information including at least one commodity identifier; sending an order-picking task to an order-picking terminal according to the order information, the order-picking task including commodity information corresponding to the commodity identifier; and sending a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal. The order processing method, the order-picking task processing method, the server, the order-picking terminal, and the electronic price tag provided in the present disclosure improve the order-picking efficiency of an order picker, thus improving the processing rate of order information.

17 Claims, 10 Drawing Sheets

(56) References Cited

U.S. PATENT DOCUMENTS

| | | |
|---|---|---|
| 9,171,281 B1 * | 10/2015 | Francis .............. G06Q 10/0875 |
| 2001/0049629 A1 | 12/2001 | Freeman |
| 2007/0067200 A1 | 3/2007 | Patel |
| 2008/0183327 A1 * | 7/2008 | Danelski .............. B65G 1/1376 |
| | | 700/216 |
| 2014/0301810 A1 | 10/2014 | Steinbach |
| 2015/0217937 A1 * | 8/2015 | Marquez .............. B65G 1/1373 |
| | | 700/216 |
| 2017/0200217 A1 * | 7/2017 | Huseth ................... G01C 21/00 |
| 2018/0324550 A1 | 11/2018 | Todeschini et al. |

* cited by examiner

ORDER PROCESSING AND ORDER-PICKING TASK PROCESSING METHOD, SERVER, ORDER-PICKING TERMINAL, AND ELECTRONIC PRICE TAG

CROSS REFERENCE TO RELATED PATENT APPLICATIONS

This application claims priority to and is a continuation of Chinese Patent Application No. 201710512817.0, filed on 29 Jun. 2017 and entitled "ORDER PROCESSING AND ORDER-PICKING TASK PROCESSING METHOD, SERVER, ORDER-PICKING TERMINAL, AND ELECTRONIC PRICE TAG", which is incorporated herein by reference in its entirety.

TECHNICAL FIELD

The present disclosure relates to the field of data processing technologies, and, more particularly, to order processing and order-picking task processing methods and servers, order-picking terminals, and electronic price tags.

BACKGROUND

With the continuous development of logistics technologies, more commodities may be delivered to users' homes from warehouses quickly and conveniently. Commodities in a warehouse generally may be classified and stored according to types of the commodities, so that an order picker of the warehouse may quickly find required commodities.

At present, an order picker at a warehouse or a store may find commodities in order information one by one from the warehouse when receiving the order information of a user. When the commodities in the order information are all picked, the order picker may complete the order information and continue to operate a next piece of order information.

The order picker at the warehouse will generally memorize approximate positions of commodities in the warehouse or on shelves of the store to improve the efficiency of order-picking. As such, the order picker may go to the memorized positions to find the required commodities when performing order-picking according to the order information.

However, the efficiency of order-picking in the foregoing manner generally depends on the degree of familiarity of the order picker with commodity positions. Once the commodity positions are changed or the order picker lacks memory of the commodity positions, the efficiency of order-picking will be severely reduced, thus delaying the order information of the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an order processing method, an order-picking task processing method, a server, an order-picking terminal, and an electronic price tag that may improve the order-picking efficiency of an order picker, thus improving the processing rate of order information.

The present disclosure provides an order processing method. The method includes: receiving order information, the order information including at least one commodity identifier; sending an order-picking task to an order-picking terminal according to the order information, the order-picking task including commodity information corresponding to the commodity identifier; and sending a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal.

The present disclosure further provides a server. The server includes a network communication port, a memory, and a processor, wherein the network communication port is configured to conduct network data communication; the memory is configured to store received order information; and the processor is configured to control the network communication port to receive order information, the order information including at least one commodity identifier; control the network communication port to send an order-picking task to an order-picking terminal according to the order information, the order-picking task including commodity information corresponding to the commodity identifier; and control the network communication port to send a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal.

The present disclosure further provides an order-picking task processing method. The method includes: receiving an order-picking task, wherein the order-picking task includes at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information.

The present disclosure further provide an order-picking terminal. The order-picking terminal includes a network communication port, a display screen, and a memory, wherein the network communication port is configured to receive an order-picking task, wherein the order-picking task includes at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information; the display screen is configured to display the commodity information and the prompt information; and the memory is configured to store the order-picking task.

The present disclosure further provides an order-picking task processing method. The method includes: receiving an order-picking task, the order-picking task including at least one commodity identifier; sending a prompt instruction via a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

The present disclosure further provides an order-picking terminal. The order-picking terminal includes a network communication port, a memory, and a processor, wherein the network communication port is configured to conduct network data communication; the memory is configured to store a received order-picking task; and the processor is configured to control the network communication port to receive an order-picking task, the order-picking task including at least one commodity identifier; and control the network communication port to send a prompt instruction via a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

The present disclosure further provides an electronic price tag. The electronic price tag includes a network communication module, a prompt signal module, a memory, and a processor, wherein the network communication module is configured to receive a notification instruction sent by a server and receive a prompt instruction sent by an order-picking terminal; the prompt signal module is configured to send a prompt signal; the memory is configured to store the notification instruction; and the processor is configured to control the network communication module to receive the notification instruction sent by the server, and store the notification instruction to the memory, the notification instruction including a commodity identifier; and control the prompt signal module to send a prompt signal when the prompt instruction that is sent by the order-picking terminal and received by the network communication module under control carries the commodity identifier.

As shown in the present disclosure, a prompt apparatus capable of sending a prompt signal is disposed at a commodity for sale. As such, a server, upon receiving order information of a user, may send an order-picking task to an order-picking terminal of an order picker. At the same time, the server may send a prompt instruction to a prompt apparatus corresponding to the commodity included in the order information. The prompt apparatus corresponding to the to-be-picked commodity may send a prompt signal to remind the order picker of a position where the commodity is located. As such, the order picker may perform order-picking conveniently according to the prompt signal, and the efficiency of order-picking may be improved, thus improving the processing rate of order information.

BRIEF DESCRIPTION OF THE DRAWINGS

To describe the technical solutions in the example embodiments of the present disclosure, the following briefly introduces the accompanying drawings for describing the implementation of the present disclosure. It is apparent that the accompanying drawings described below merely represent some examples, and those of ordinary skill in the art may still derive other drawings from these accompanying drawings without any creative efforts.

DETAILED DESCRIPTION

Figure 1:
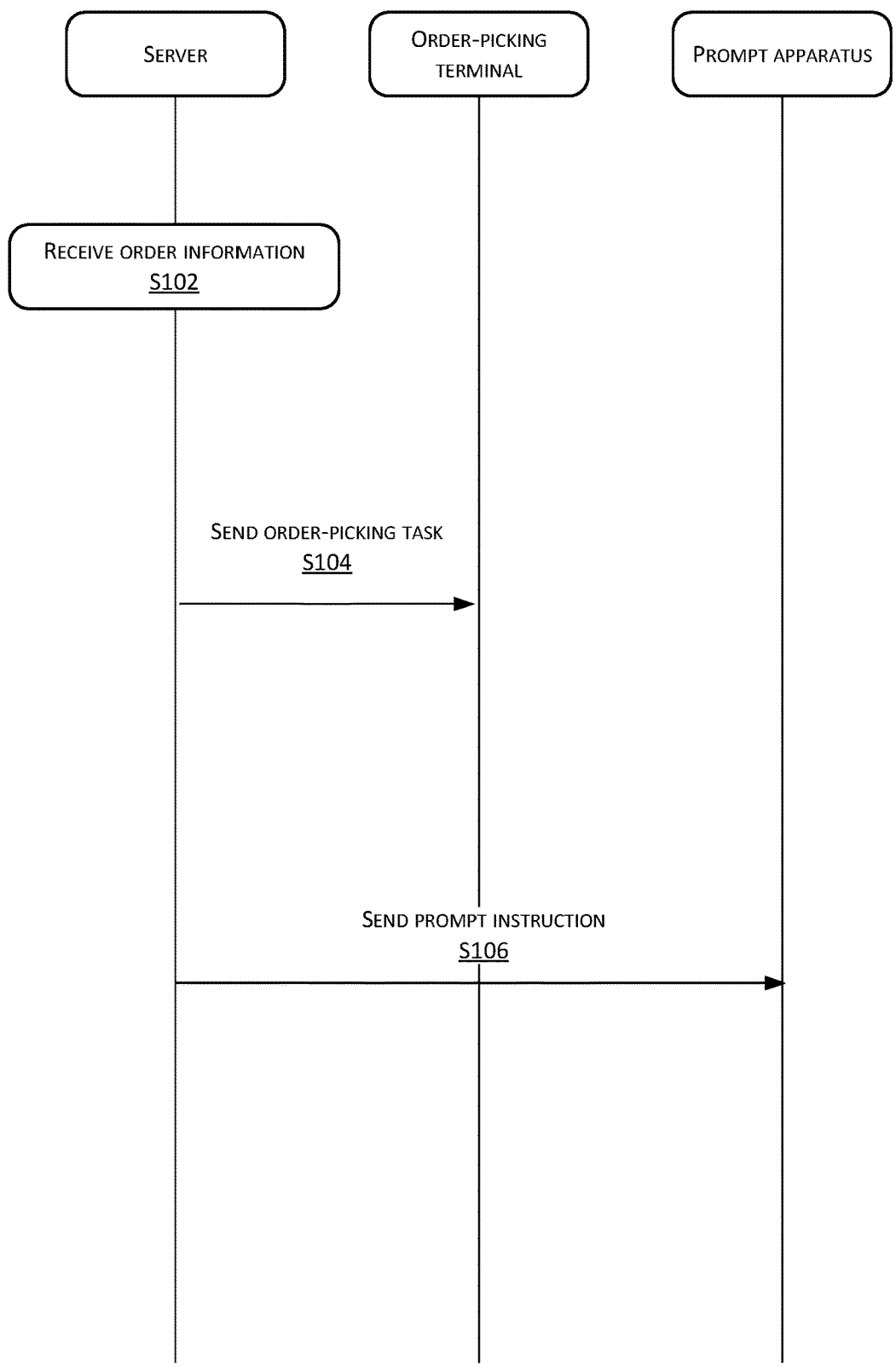
FIG. 1 is a flowchart of an order processing method according to an example embodiment of the present disclosure.

To enable a person of ordinary skill in the art to better understand the technical solutions in the present disclosure, the technical solutions in the example embodiments of the present disclosure will be described clearly and completely below through the accompanying drawings in the example embodiments of the present disclosure. It is apparent that the described example embodiments merely represent a part of rather than all the example embodiments of the present disclosure. Based on the example embodiments of the present disclosure, all other example embodiments derived by those of ordinary skill in the art without any creative efforts shall fall within the protection scope of the present disclosure.

An example embodiment of the present disclosure provides an order processing method. The method may be applied to system architecture including a server, an order-picking terminal, and a prompt apparatus. The server may be an electronic device having a data computing function, a storage function, and a network interaction function, and may also be software that runs in the electronic device and supports data processing, storage, and network interaction.

The quantity of the servers is not specifically limited in this example embodiment. The server may be one server, a plurality of servers, or a server cluster formed by several servers.

In this example embodiment, the server may be a management server in a physical store. A corresponding relationship between commodities and prompt apparatuses may be stored in the management server. For example, both the commodities and the prompt apparatuses may be represented by identifiers in the management server. The identifiers of the commodities may be character strings that are entered into the management server by a manager of the physical store and may represent the commodities. The identifiers of the commodities may be set according to the types of the commodities. Identical commodities may correspond to the same identifier. Definitely, in an actual application scenario, a primary identifier and a secondary identifier may be set for each commodity for tracking the commodity. Identical commodities may have the same primary identifier, and primary identifiers of different commodities are usually different. Identical commodities may each have a unique secondary identifier. As such, a commodity may be represented uniquely by using a combination of the primary identifier and the second identifier.

In this example embodiment, the prompt apparatus may be an electronic device that is mounted on a shelf of commodities and configured to indicate a position of the commodities and may send a prompt signal. For example, the prompt apparatus may be an electronic device such as a display screen, an LED lamp, and a buzzer, or a combination of the foregoing electronic devices. The prompt signal may be a signal used for drawing attention of an order picker. For example, the prompt signal may include at least one of a sound prompt, a vibration prompt, and a light prompt. Definitely, with the continuous development of technologies, there may be more signals capable of drawing attention of the order picker in future, and any signal that may achieve the effect of the prompt signal in the present disclosure shall fall within the protection scope of the present disclosure.

In this example embodiment, the order-picking terminal may be a mobile phone, a personal digital assistant, a smart wearable device, a portable shopping-guide terminal, and the like used by the order picker and having a network communication function and a data processing function. In this example embodiment, the server, the order-picking terminal, and the prompt apparatus may interact with each other in a wireless communication manner. The wireless communication manner may include, for example, Wi-Fi, Bluetooth, ZigBee, Near Filed Communication (NFC), Z-wave, 2G/3G/4G, and other communication manners. Definitely, the server, the order-picking terminal, and the prompt apparatus may interact with each other in a wired communication manner when necessary. For example, data interaction may be performed there between through a USB data line.

Referring to FIG. 1, an example embodiment of the present disclosure provides an order processing method, the method may be applied to a physical store, and the physical store is provided with prompt apparatuses corresponding to commodities for sale. The method may be executed by the foregoing server. When being executed by the server, the method may include the following steps.

S102: Order information is received, the order information including at least one commodity identifier.

In this example embodiment, a user may send order information to a physical store by logging onto an official website of the physical store, or by using an Application (APP) of the physical store, or in other manners. When sending the order information, the user may select a to-be-purchased commodity by using a selection key on an interface. The commodity selected by the user may be, for example, stored in a shopping cart, and order information corresponding to the commodity selected by the user may be generated when the user submits the order information.

In this example embodiment, the order information may be data carrying at least one commodity identifier. The commodity identifier may point to a commodity in the physical store. That the commodity identifier points to the commodity may indicate that the commodity identifier is associated with information of the commodity. The information of the commodity may include, for example, a region of the physical store where the commodity is located, a number of a shelf where the commodity is located, an identifier of a corresponding prompt apparatus, and the like. The association relationship between the commodity identifier and the information of the commodity may be stored in the server. As such, when receiving the order information sent by the user, the server may acquire information of a commodity associated with each commodity identifier according to the commodity identifier included in the order information.

In this example embodiment, the commodity identifiers may be character strings that are entered into the management server by a manager of the physical store and may represent the commodities. The commodity identifiers may be set according to the types of the commodities. Identical commodities may correspond to the same identifier. Definitely, in an actual application scenario, a primary identifier and a secondary identifier may be set for each commodity for tracking the commodity. Identical commodities may have the same primary identifier, and primary identifiers of different commodities are usually different. However, identical commodities may each have a unique secondary identifier. As such, a commodity may be represented uniquely by using a combination of the primary identifier and the second identifier.

S104: An order-picking task is sent to an order-picking terminal according to the order information, the order-picking task including commodity information corresponding to the commodity identifier.

In this example embodiment, after receiving the order information sent by the user, the server may inform the order picker of picking the commodity involved in the order information. The order picker may generally use an order-picking terminal and may perform information interaction with the server by using the order-picking terminal.

In this example embodiment, the server may send an order-picking task to the order-picking terminal according to the order information. For example, the order-picking task may be sent in different manners according to different scales of physical stores. For example, when the physical store is small in scale and only needs one order picker for order-picking, the server may send all commodity identifiers in the order information as an order-picking task to an order-picking terminal used by the order picker. For example, the server may extract at least one commodity identifier from the order information and send an order-picking task carrying the at least one commodity identifier to the order-picking terminal.

In this example embodiment, both the order information and the order-picking task may be character strings compiled according to a preset rule. The preset rule may define fields included in the character string and an arrangement rule of the fields. For example, the order-picking task may include a commodity identifier field. The commodity identifier field may be filled with an identifier of the commodity selected by the user. As such, by reading the commodity identifier field, the commodity identifier included in the commodity identifier field may be recognized and extracted.

In this example embodiment, the character string representing the order-picking task may also include a commodity identifier field, and the commodity identifier field may be filled with an identifier of a commodity that needs to be picked by the order picker. In the foregoing scenario where there is only one order picker, the commodity identifier field of the order-picking task may be filled with the extracted at least one commodity identifier. As such, after receiving the order-picking task carrying the at least one commodity identifier, the order-picking terminal of the order picker may display in an interface the commodity that needs to be picked by the order picker. As such, the order-picking task may be used for informing the order picker using the order-picking terminal of the commodity that needs to be picked.

Figure 2:
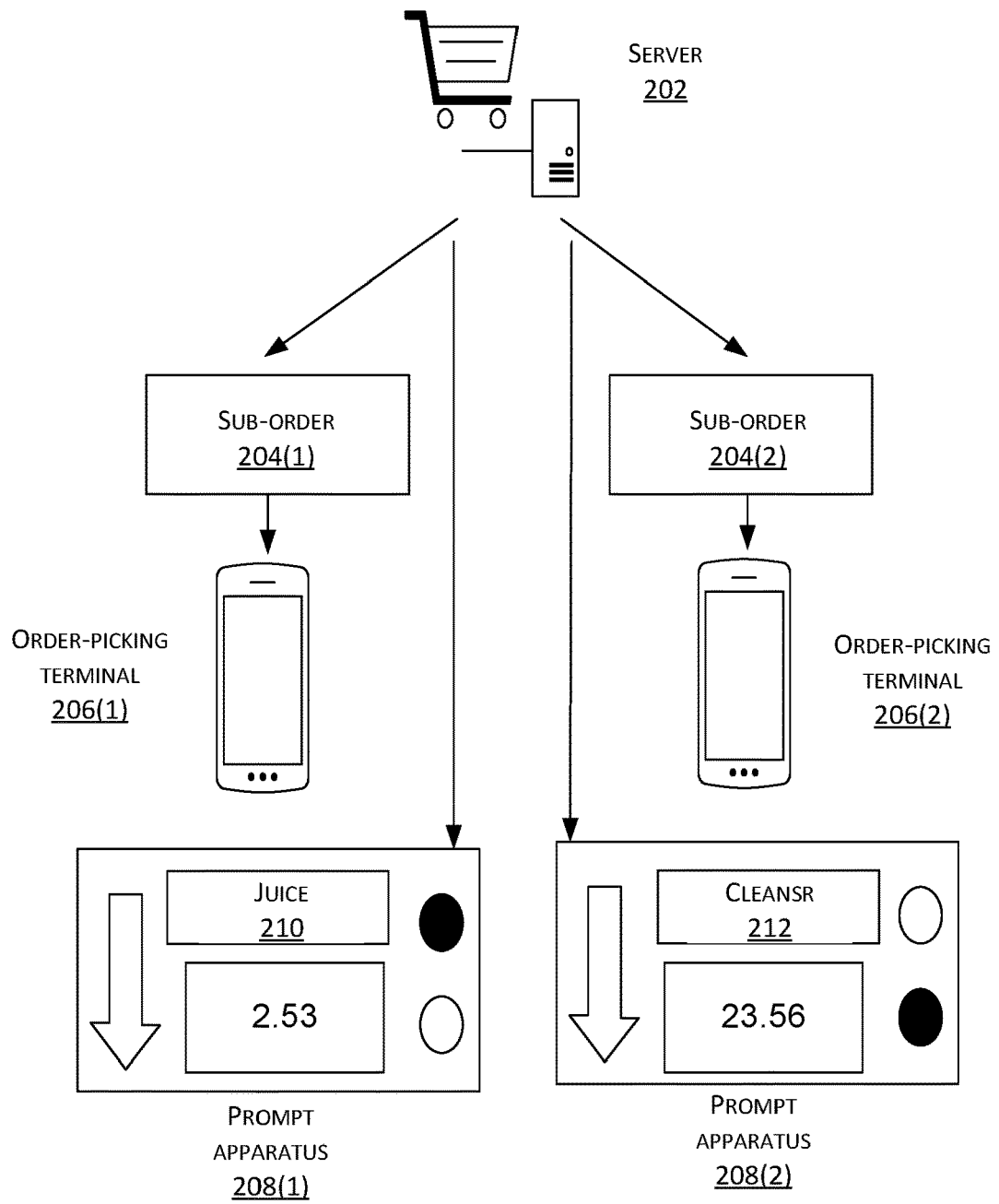
FIG. 2 is a schematic diagram of division into sub-order information according to an example embodiment of the present disclosure.

Referring to FIG. 2, in this example embodiment, when the physical store is large in scale, one order picker generally cannot pick all commodities in one piece of order information in time. In this case, a server 202 may divide the received order information into multiple pieces of sub-order information such as a sub-order 204(1) and a sub-order 204(2) and deliver the multiple pieces of sub-order information to multiple order pickers for processing. In this example embodiment, the server 202 may divide the order information into sub-order information according to positions of commodities in the physical store. For example, commodities in the physical store may be classified and stored according to categories. Commodities of the same category may generally be stored in the same region. For example, the commodities in the physical store may be classified into beverages, staple foods, seasonings, cosmetics, bath products, and the like. Each category of commodities may correspond to one region, and one or more order pickers may be responsible for order-picking in each region.

In this example embodiment, when there is more than one order picker, the order information may be divided into at least two pieces of sub-order information, wherein each piece of sub-order information includes at least one commodity identifier, and the commodity identifiers in the same piece of sub-order information correspond to the same order-picking terminal, such as an order-picking terminal 206(1) and an order-picking terminal 206(2). The server will also send prompt instruction to different prompt apparatuses such as a prompt apparatus 208(1) and a prompt apparatus 208(2) corresponding to the commodities. The information of the commodities may include juice 210 and its price $2.53 or cleanser 212 and its price $23.56.

In this example embodiment, when dividing the order information into sub-order information, the server may classify commodities located in the same region into the same piece of sub-order information. As such, the sub-order information after the division may be submitted to order pickers in different regions for order-picking. The order-picking terminal of the order picker may have a corresponding relationship with commodity identifiers in the region under the charge of the order picker. The corresponding relationship may be pre-configured in the server. For example, in the server 202, commodities in a beverage region may have the same primary identifier that may be used for distinguishing from other types of commodities. The order-picking terminal used by the order picker responsible for the beverage region may have a terminal identifier. The terminal identifier may be noted in the beverage region, indicating that all sub-order information involving the commodities in the beverage region may be sent to the order-picking terminal. As such, the order-picking terminal and the commodity identifier that are located in the same region may have a corresponding relationship.

In this example embodiment, when dividing order information into sub-order information, the server may generally classify commodities located in the same region into the same piece of sub-order information. As a result, the sub-order information and the commodity region may also have a corresponding relationship. Therefore, the sub-order information, the order-picking terminal, and the commodity identifier may all be associated with each other based on the commodity region. After obtaining all the sub-order information, the server 202 may send each piece of sub-order information as an order-picking task to a respective corresponding order-picking terminal such as the order-picking terminal 206(1) or the order-picking terminal 206(2). In this example embodiment, for example, the server 202 divides the current order information into 2 pieces of sub-order information, wherein commodities in one piece of sub-order information are all beverages, and commodities in the other piece of sub-order information are all seasonal vegetables. Then, the sub-order information involving beverages may be sent to an order-picking terminal used by an order picker in a beverage region, and the sub-order information involving seasonal vegetables may be sent to an order-picking terminal used by an order picker in a seasonal vegetable region.

In this example embodiment, the server may divide the order information into sub-order information according to primary identifiers in commodity identifiers. The primary identifier may be used for representing the type of a commodity. As such, the server may classify commodities having the same primary identifier into the same piece of sub-order information. In this example embodiment, each order-picking terminal may have a unique identifier. The identifier may be, for example, an IP address of the order-picking terminal in the network, or a character string preset by the server for each order-picking terminal, or a login name of each order-picking terminal bearing system. If each order-picking terminal uses a fixed IP address, the IP address of each order-picking terminal may be entered into the server. After dividing the order information into sub-order information, the server may query for an IP address of an order-picking terminal corresponding to the sub-order information and send the sub-order information as an order-picking task to the IP address.

Moreover, if the IP address used by the order-picking terminal varies each time the terminal is started up, the server may add a target identifier of the order-picking terminal to the order-picking task. As such, the server may send an order-picking task carrying the target identifier to each order-picking terminal in the current network. When receiving an order-picking task, the order-picking terminal will retain the order-picking task only when verifying that the target identifier carried in the received order-picking task is identical to or matches the identifier of the order-picking terminal; otherwise, the order-picking terminal will directly discard the received order-picking task. That the target identifier matches the identifier of the order-picking terminal may indicate that there is a conversion relationship between the target identifier and the identifier of the order-picking terminal. The conversion relationship generally may be obtained by executing an encryption algorithm on the target identifier. The encryption algorithm may be, for example, an asymmetric algorithm or a hash algorithm. As such, even if the order-picking task is intercepted, it cannot be known to which order-picking terminal the order-picking task is sent, thus guaranteeing the safety of data transmission.

S106: A prompt instruction is sent to a prompt apparatus corresponding to the commodity identifier, such that the prompt apparatus sends a prompt signal to facilitate an order picker using the order-picking terminal to determine a commodity corresponding to the commodity identifier according to the prompt signal.

In this example embodiment, the server may further send a prompt instruction to a prompt apparatus corresponding to a commodity indicated by the commodity identifier in the order information. The commodity indicated by the commodity identifier in the order information may be a to-be-picked commodity. The prompt instruction may be merely a request packet. The request packet may include no substantial content, but only include characters that may indicate a packet type. For example, the server may send a Request packet to a prompt apparatus corresponding to a to-be-picked commodity, and "request" may be filled in a character string indicating a packet type in the packet. As such, when receiving the Request packet, the prompt apparatus may send a prompt signal, to facilitate the order picker using the order-picking terminal to find the commodity corresponding to the prompt apparatus.

In this example embodiment, the prompt signal may be a signal used for drawing attention of the order picker. For example, the prompt signal may include at least one of a sound prompt, a vibration prompt, and a light prompt. It should be noted that, in an actual application scenario, the prompt apparatus may send prompt signals in different manners at the same time. For example, the prompt apparatus may flash a red light, flash a yellow light, or buzz. As such, when sending the prompt instruction to the prompt apparatus corresponding to the to-be-picked commodity, the server may further designate a manner of the sent prompt signal. In this example embodiment, the prompt instruction may include a prompt signal identifier used for representing a prompt manner of the prompt signal, such that the prompt apparatus sends a prompt signal consistent with the prompt manner. In this case, the server may also add the prompt signal identifier to the order-picking task sent to the order-picking terminal, in order that the order picker may recognize the prompt signal in a particular form that is sent for him/her. As such, the prompt signal identifier may also remind the order picker to pay attention to the prompt signal in a particular form. For example, after obtaining sub-order information related to beverages by division, the server assigns such a prompt signal as flashing a yellow light to the sub-order information. As such, the server may add an identifier for representing flashing a yellow light to the order-picking task and the prompt instruction. As such, the order picker may notice the prompt signal in a form of flashing a yellow light, and the prompt apparatus corresponding to the commodity involved in the sub-order information related to beverages may also send a prompt signal in a form of flashing a yellow light.

In this example embodiment, multiple pieces of sub-order information may be executed at the same time. Therefore, the server, when assigning prompt signal identifiers for sub-order information, may enable prompt signal identifiers in order-picking tasks corresponding to different pieces of sub-order information to be different, in order that order pickers may recognize the different pieces of sub-order information. For example, various types of prompt signals that may be sent by the prompt apparatuses may be pre-stored in the server. Hence, when obtaining multiple pieces of sub-order information by division, the server may assign a prompt signal identifier to each piece of sub-order information sequentially, and the assigned prompt signal identifier cannot be assigned again in the same piece of order information. As such, when there are many pieces of sub-order information, some pieces of sub-order information need to enter an ordered queue of the server as the prompt apparatuses may only send limited types of prompt signals. The server may continue to assign different prompt signal identifiers to the sub-order information in the ordered queue only when the previous sub-order information is completed and the assigned prompt signal forms are released.

As may be seen in the present disclosure that a prompt apparatus capable of sending a prompt signal is disposed at commodities for sale. As such, a server, upon receiving order information of a user, may send an order-picking task to an order-picking terminal of an order picker. At the same time, the server may send a prompt instruction to a prompt apparatus corresponding to a commodity included in the order information. The prompt apparatus corresponding to the to-be-picked commodity may send a prompt signal to remind the order picker of a position where the commodity is located. As such, the order picker may perform order-picking conveniently according to the prompt signal, and the efficiency of order-picking may be improved, thus improving the processing rate of order information.

In an example embodiment of the present disclosure, if order pickers in a physical store are not pre-designated to perform order-picking in fixed regions but may perform order-picking completely freely in the whole physical store, in this case, the server may send a corresponding order-picking task to an order picker closer to a to-be-picked commodity when sending order-picking tasks to order-picking terminals, so as to improve the order-picking efficiency of the order pickers. For example, the server may determine a position in the physical store corresponding to the order-picking task. The position corresponding to the order-picking task may indicate a position of the commodity in the order-picking task in the physical store. The scenario considered here is that all commodities in the order-picking task are located in the same region. If commodities in original order information are located in different regions, the server may divide the original order information such that all commodities in an order-picking task after the division are located in the same region. In this case, after determining the position corresponding to the order-picking task, the server may determine an order-picking terminal closest to the position from at least one order-picking terminal and send the order-picking task to the determined order-picking terminal. Each order-picking terminal may be provided with a positioning module. When running, the positioning module may feedback a current position of the order-picking terminal to the server periodically. The positions in the physical store may be allocated with coordinates in the server in advance. As such, a distance between each order-picking terminal and the position corresponding to the order-picking task may be determined by calculating a distance between the fed-back coordinates of each order-picking terminal and the coordinates of the position corresponding to the order-picking task. As such, the server may select the order-picking terminal in the minimum distance and send the order-picking task to the order-picking terminal.

It should be noted that, in an actual application scenario, it may be further determined whether the determined order-picking terminal is available after the order-picking terminal closest to the position is determined. Whether the order-picking terminal is available may refer to whether a task list of the order-picking terminal is already full. When the task list is already full, it indicates that the order-picking terminal is unavailable. As such, the order-picking task may be sent to the determined order-picking terminal only when the determined order-picking terminal is available, to guarantee that the order-picking task may be executed normally.

In an example embodiment of the present disclosure, the order picker may perform order-picking by using the order-picking terminal. For example, the order-picking terminal may receive an input commodity identifier. The commodity identifier may be input to the order-picking terminal by the order picker. For example, the order picker may input a number of the commodity to the order-picking terminal to indicate that the commodity has been picked. Moreover, the order-picking terminal may further be provided with a module for scanning a commodity identifier. As such, a coded pattern such as a bar code or a QR code carrying the commodity identifier may be scanned by using the module, and the commodity identifier may be automatically recognized. Therefore, the commodity identifier may be input to the order-picking terminal automatically after being recognized.

In this example embodiment, after the commodity identifier is input, the order-picking terminal may compare the input commodity identifier with the commodity identifier in the order-picking task stored locally. When the input commodity identifier matches one commodity identifier in the order-picking task, it indicates that order-picking of the commodity indicated by the commodity identifier may be completed. If the two are inconsistent with each other, it indicates that the commodity indicated by the input commodity identifier is not the commodity that needs to be picked by the order picker.

Figure 3:
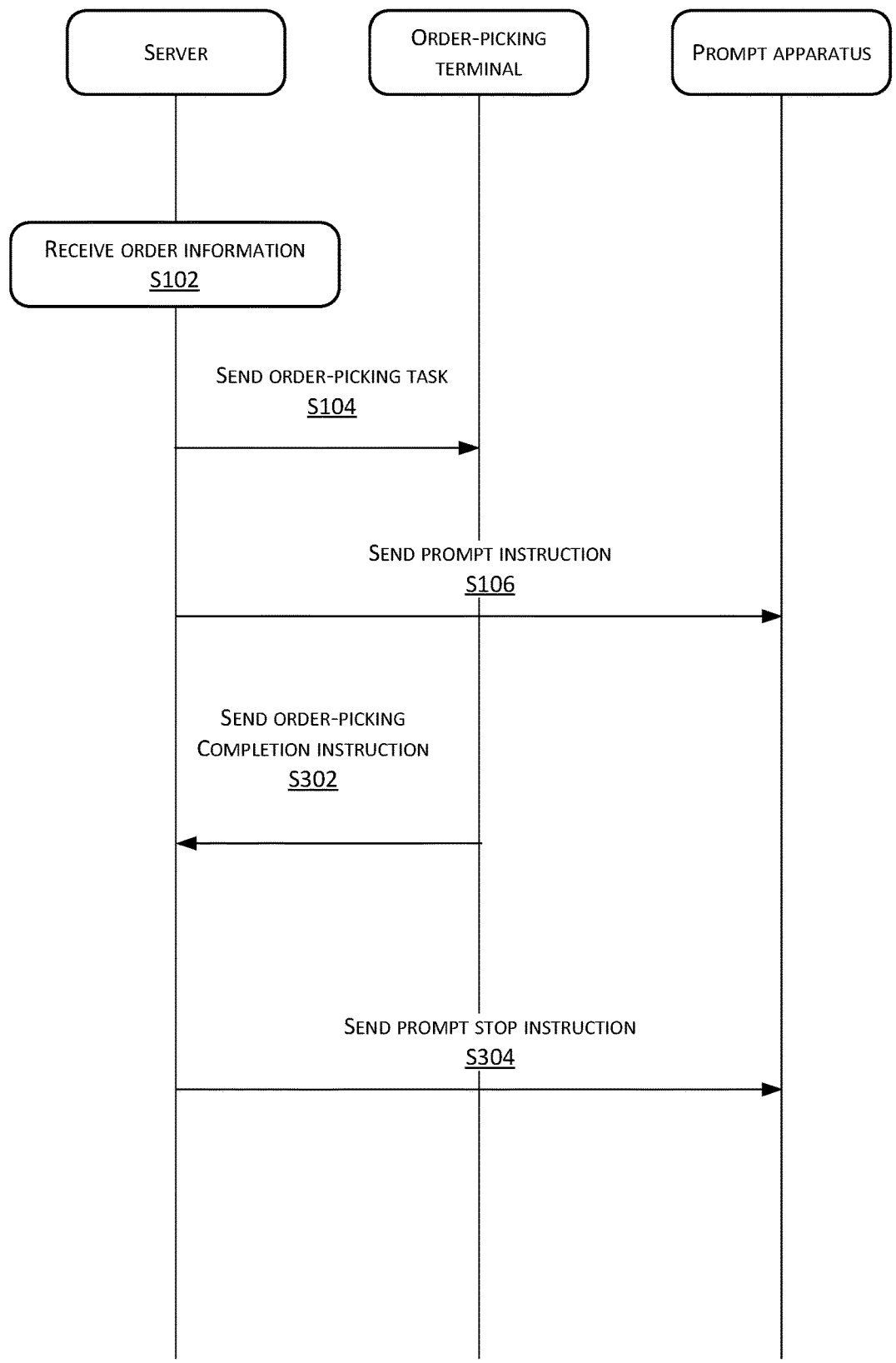
FIG. 3 is a flowchart of completing order-picking according to an example embodiment of the present disclosure.

Referring to FIG. 3, in this example embodiment, after completing order-picking processes of all commodities in the order-picking task, at S302, the order-picking terminal may send an order-picking complete instruction to the server. As such, after receiving the order-picking complete instruction, the server may instruct prompt apparatuses corresponding to the order-picking task to stop sending the prompt signal. For example, at S304, the server may send a prompt stop instruction to the prompt apparatus corresponding to the commodity indicated by the commodity identifier in the order information, such that the prompt apparatus stops sending the prompt signal. The prompt stop instruction may be merely a response packet. The response packet may include no substantial content, but only include characters that may indicate a packet type. For example, the server may send a Response packet to the prompt apparatus, and "Response" may be filled in a character string indicating a packet type in the packet. As such, the prompt apparatus may stop sending the prompt signal when receiving the Response packet.

In an example embodiment of the present disclosure, the prompt apparatus may send more than one prompt signal at the same time, to inform different order pickers of respective commodities that need to be picked. In this case, after an order picker completes an order-picking process of the order-picking task, the prompt stop instruction sent by the server to the prompt apparatus may further include a prompt signal identifier used for representing a prompt manner of the prompt signal, such that the prompt apparatus stops sending a prompt signal consistent with the prompt manner. As such, when completing the order-picking process of the order-picking task, an order picker may request the server to turn off the prompt signal for the order picker himself/ herself, while prompt signals for other order pickers are kept unchanged. As such, it may be ensured that different order pickers may perform respective order-picking processes orderly.

Figure 4:
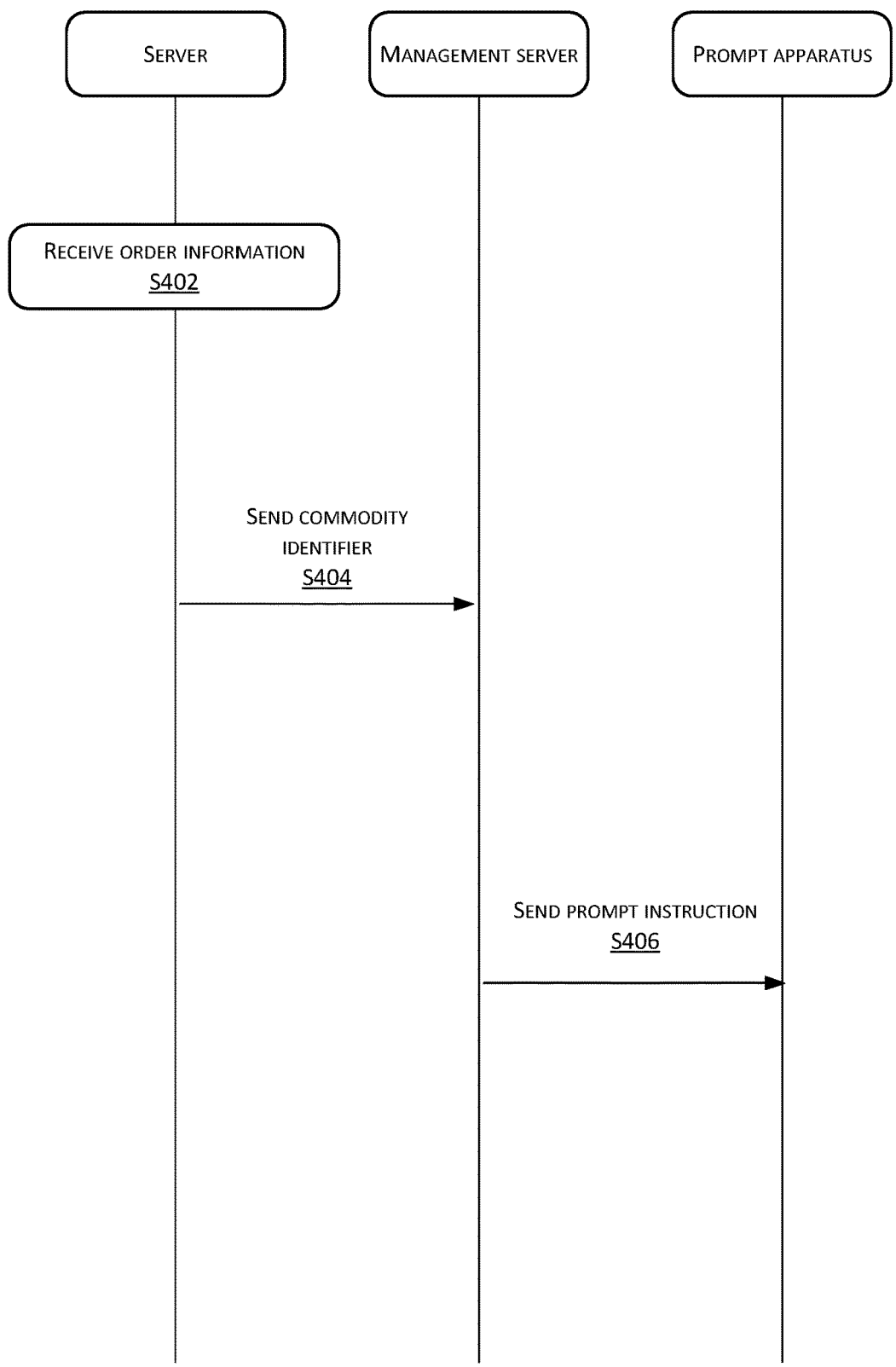
FIG. 4 is a schematic flowchart of a management server according to an example embodiment of the present disclosure.

Referring to FIG. 4, in an example embodiment of the present disclosure, the prompt apparatuses in the physical store may be managed by a management server, and each prompt apparatus may be connected to the management server. This connection manner may be a wired connection manner, for example, a connection using an optical fiber or a cable, and may also be a wireless connection manner, for example, a connection using Wi-Fi. Various kinds of information associated with the prompt apparatuses may be stored in the management server. For example, the management server may store a binding relationship between the prompt apparatuses and the commodities and may also store a prompt signal mode supported by each prompt apparatus. In this case, at S402, the server receives order information. The server receiving the order information may perform instruction interaction with the prompt apparatus by using the management server. For example, at S404, the server may send the commodity identifier in the order information to the management server, and, at S406, the management server sends a prompt instruction to a prompt apparatus corresponding to a commodity indicated by the commodity identifier in the order information. The server may recognize the included commodity identifier from the order information, and then send the recognized commodity identifier to the management server. The management server may send a prompt instruction to the prompt apparatus corresponding to the commodity indicated by the commodity identifier according to the locally-stored binding relationship between commodity identifiers and prompt apparatuses, to remind the order picker of the commodity that needs to be picked.

Figure 5:
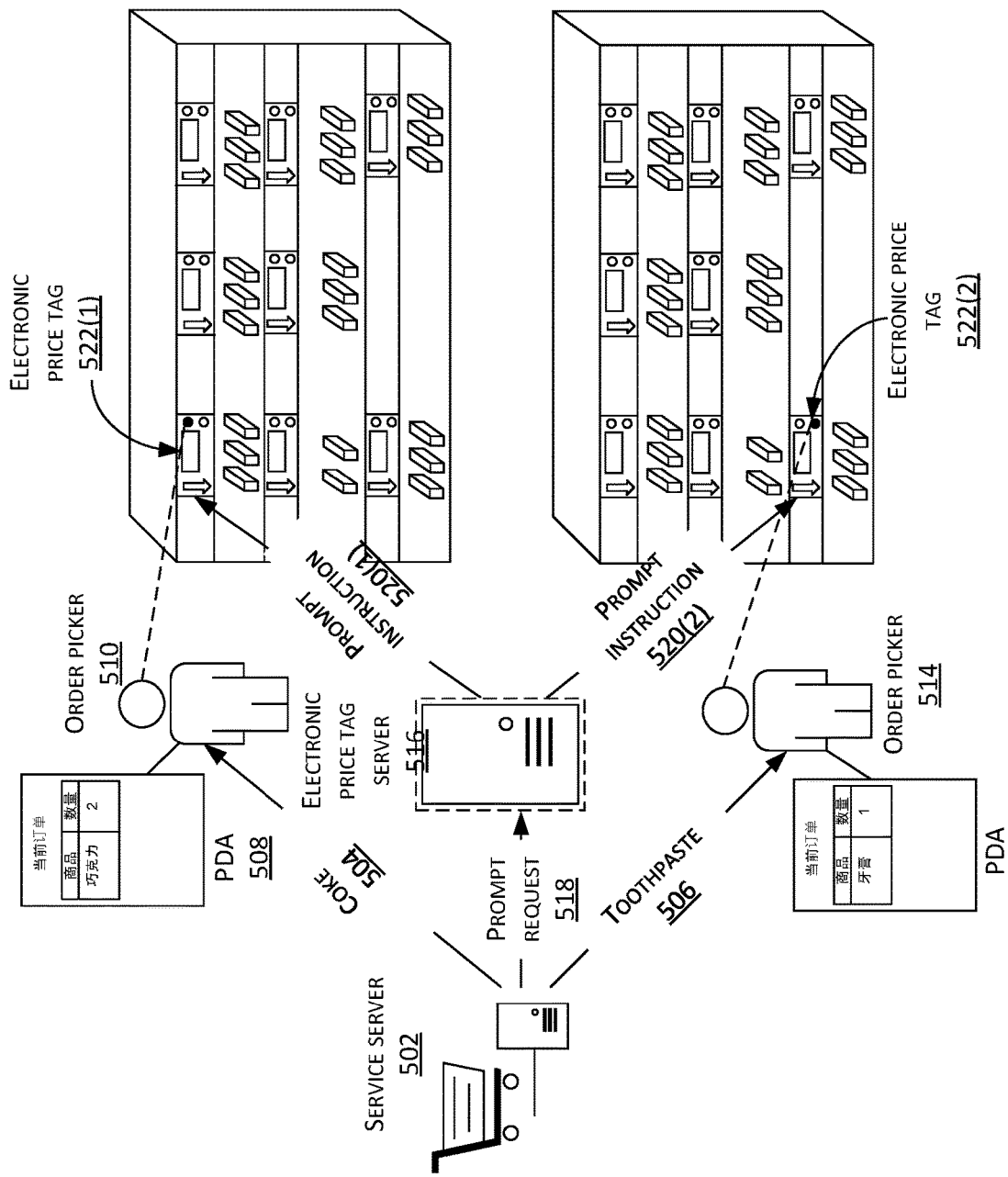
FIG. 5 is a schematic diagram of a specific implementation scenario according to the present disclosure.

Referring to FIG. 5, in an example application scenario, a user sends order information by using a mobile phone application, and the order information includes a bottle of coke and a tube of toothpaste. A service server 502 of an offline store receives the order information. The coke and the toothpaste are placed in regions far apart as the scale of the warehouse is large. In this case, the service server 502 may divide the order information into two pieces of sub-order information. One piece of sub-order information is coke 504, and the other piece of sub-order information is toothpaste 506. At this point, the service server 502 may send the sub-order information including the coke 504 to a PDA 508 of an order picker 510 in a food/beverage region and send the sub-order information including the toothpaste 504 to a PDA 512 of an order picker 514 in a hygiene product region. In the offline store, each commodity may correspond to an electronic price tag. The electronic price tag may be provided with a display screen for displaying a commodity price and at least one LED lamp. The at least one LED lamp may remind the order picker of the specific position of the commodity by flickering. These electronic price tags may be uniformly managed by an electronic price tag server 516. As such, the service server 502 may send a prompt request 518 for the coke 504 and the toothpaste 506 to the electronic price tag server 516. The prompt request 518 may carry numbers of the coke 504 and the toothpaste 506. After receiving the prompt request, the electronic price tag server 516 may send prompt instructions to corresponding electronic price tags respectively according to the serial numbers of the coke 504 and the toothpaste 506. For example, the electronic price tag server 516 sends a prompt instruction 520(1) to an electronic price tag 522(1) corresponding to the coke 504, and a prompt instruction 520(2) to an electronic price tag 522(2) corresponding to the toothpaste 506.

The electronic price tags 522(1) and 522(2) of the coke 504 and the toothpaste 506 respectively may turn on the LED lamps to flicker when receiving the prompt instructions 520(1) and 520(2) respectively, to remind the order pickers 510 and 514 respectively of the positions of the coke 504 and the toothpaste 506. After the PDA 508 of the order picker 510 or the PDA 512 of the order picker 514 receives the sub-order information, the order picker 510 or 514 may search a corresponding region for a commodity of which the LED lamp flickers. After finding the commodity, the order picker 510 or 514 may scan a bar code on the commodity by using a scanning module on the PDA 508 or 510, and place the corresponding commodity on a shopping line, to complete the order-picking process. The order picker 510 or 514 may touch the electronic price tag 522(1) or 522(2) of the commodity with the PDA 508 or 512 after finishing picking the commodity. For example, an NFC module in the PDA 508 communicates with an NFC module in the electronic price tag 522(1) to turn off the LED lamp of the electronic price tag 522(1). At the same time, the PDA 508 may send an order-picking complete instruction to the service server 502. For example, after the order-picking processes of the coke 504 and the toothpaste 506 are completed, the PDAs 508 and 512 of the two order pickers 510 and 514 may both send an order-picking complete instruction to the service server 502. After receiving the order-picking complete instructions sent by the PDAs 508 and 512, the service server 502 may check whether order-picking for all the sub-order information in the original order information has been completed. The next piece of order information may be processed if the order-picking has been completed.

Figure 6:
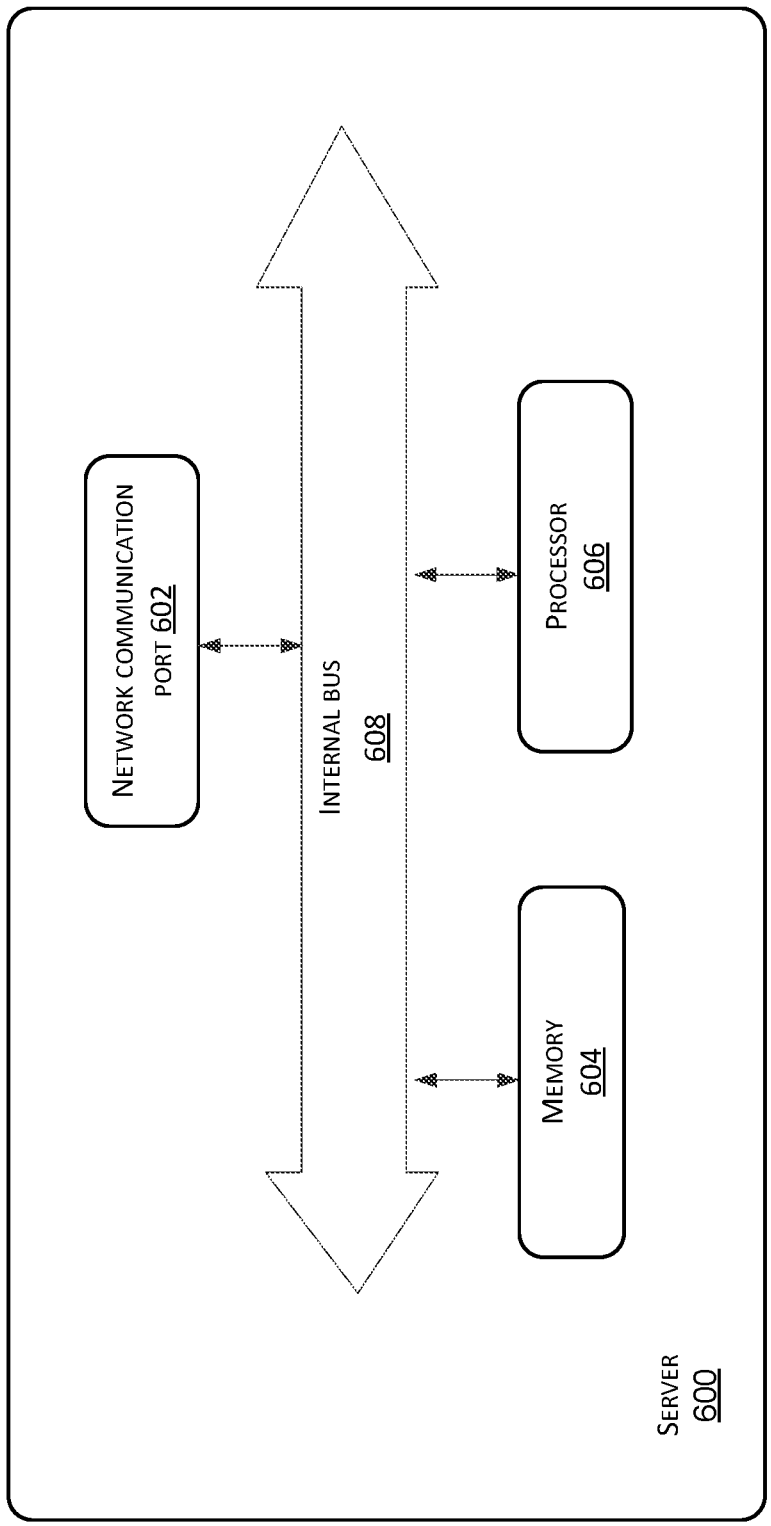
FIG. 6 is a schematic structural diagram of a server according to an example embodiment of the present invention.

Referring to FIG. 6, the present disclosure further provides a server 600. The server 600 includes a network communication port 602, a memory 604, a processor 606, and an internal bus 608.

The network communication port 602 is configured to conduct network data communication.

The memory 604 is configured to store received order information.

The processor 606 is configured to control the network communication port 602 to receive order information, the order information including at least one commodity identifier; control the network communication port 602 to send an order-picking task to an order-picking terminal according to the order information, the order-picking task including commodity information corresponding to the commodity identifier; and control the network communication port 602 to send a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal.

In this example embodiment, the network communication port 602 may be a virtual port that is bound with different communication protocols and capable of sending or receiving different data. For example, the network communication port may be a No. 80 port responsible for web data communication, a No. 21 port responsible for FTP data communication, or a No. 25 port responsible for mail data communication. Moreover, the network communication port may further be a physical communication interface or communication chip. For example, the network communication port may be a wireless mobile network communication chip, such as a GSM and a CDMA, and may also be a Wi-Fi chip or a Bluetooth chip.

In this example embodiment, the memory 604 may be a memory device for storing information. In a digital system, a device capable of storing binary data may be a memory. In an integrated circuit, a circuit without a physical form but having a storage function may also be a memory, such as a RAM and a FIFO. In a system, a storage device having a physical form may also be referred to as a memory, such as a memory bank and a TF card.

The processor 606 may be implemented in any suitable manner. For example, the processor may be in the form of a microprocessor or a processor and a computer readable medium storing computer readable program codes (for example, software or firmware) executable by the (micro) processor, a logic gate, a switch, an Application Specific Integrated Circuit (ASIC), a programmable logic controller, and an embedded micro-controller. This is not limited in the present disclosure.

Specific functions implemented by the network communication port 602, the memory 604 and the processor 606 in the server disclosed in the above implementation may be explained with reference to the implementation of the order processing method of the present disclosure. The server may realize the implementation of the order processing method of the present disclosure and achieve the technical effect of the method implementation.

An example embodiment of the present disclosure further provides an order-picking task processing method. The method may be executed by the order-picking terminal, and the method includes the following steps.

An order-picking task is received. The order-picking task includes at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information.

In this example embodiment, the order-picking task may be sent by the server or by the management server. The order-picking task may be a character string compiled according to a preset rule. The preset rule may limit fields included in the character string and an arrangement rule of the fields. For example, the order-picking task may include a commodity information field. The commodity information field may be filled with commodity information of at least one commodity selected by a user. The commodity information of the at least one commodity may be used for informing the order picker using the order-picking terminal of the commodity that needs to be picked. The commodity information may be, for example, a commodity identifier. In this example embodiment, the commodity information may point to the commodity. For example, that the commodity identifier points to the commodity information may indicate that the commodity information is associated with an attribute of the commodity. The attribute of the commodity may include, for example, a region of the physical store where the commodity is located, a number of a shelf where the commodity is located, an identifier of a corresponding prompt apparatus, and the like.

In this example embodiment, the order-picking task may further include prompt information in addition to at least one piece of commodity information. The prompt information may be used for representing a prompt manner of a prompt apparatus corresponding to the commodity indicated by the commodity information. For example, the prompt information may be used for representing a prompt manner of a prompt signal sent by the prompt apparatus. The prompt signal may be a signal used for drawing attention of an order picker. For example, the prompt signal may include at least one of a sound prompt, a vibration prompt, and a light prompt. It should be noted that, in an actual application scenario, the prompt apparatus may send prompt signals in different manners at the same time. For example, the prompt apparatus may flash a red light, flash a yellow light, or buzz. In this case, the server may add corresponding prompt information to the order-picking task sent to the order-picking terminal, in order that the order picker may recognize the prompt signal in a particular form that is sent for him/her. As such, the prompt signal identifier may also remind the order picker to pay attention to the prompt signal in a particular form.

As may be seen, when receiving the order-picking task, the order-picking terminal may determine the commodity that needs to be picked according to the commodity information in the order-picking task. Meanwhile, the prompt manner of the prompt signal sent by the prompt apparatus corresponding to the commodity that needs to be picked may be known according to the prompt information in the order-picking task.

In an example embodiment of the present disclosure, the order-picking terminal may receive an input commodity identifier during order-picking. The commodity identifier may be input to the order-picking terminal by the order picker. For example, the order picker may input a number of the commodity to the order-picking terminal to indicate that the commodity has been picked. Moreover, the order-picking terminal may further be provided with a module for scanning a commodity identifier. As such, a coded pattern such as a bar code or a QR code carrying the commodity identifier may be scanned by using the module, and the commodity identifier may be automatically recognized. Therefore, the commodity identifier may be input to the order-picking terminal automatically after being recognized.

In this example embodiment, after the commodity identifier is input, the order-picking terminal may compare the input commodity identifier with the commodity information in the order-picking task stored locally. When the input commodity identifier matches one commodity identifier in the order-picking task, it indicates that order-picking of the commodity indicated by the commodity identifier may be completed. If the two are inconsistent with each other, it indicates that the commodity indicated by the input commodity identifier is not the commodity that needs to be picked by the order picker.

In an example embodiment of the present disclosure, the order picker may record an order-picking progress of each commodity in the order-picking terminal after completing the order-picking process of each commodity. At this point, the order-picking terminal may determine whether commodities indicated by all pieces of commodity information in the order-picking task all have been picked. For example, all pieces of commodity information in the order-picking task may be associated with order-picking states in the order-picking terminal. When the commodity indicated by the commodity information has been picked, an order-picking state associated with the commodity information may be "completed". As such, the order-picking terminal may determine order-picking states of all pieces of commodity information in the order-picking task. When the order-picking state of each piece of commodity information is "completed", it may indicate that the order-picking task has been completed, and a task complete prompt may be sent to the server.

In an example embodiment of the present disclosure, the order-picking terminal may synchronize the order-picking progress with the server. As such, when the order picker carries out order-picking, a user may know the current order-picking progress in real time by accessing the server. For example, each time a commodity indicated by one piece of commodity information has been picked, the order-picking terminal may send the commodity information of the picked commodity to the server to inform the server that the commodity indicated by the commodity information has been picked. As such, the server may update the order-picking state of each piece of commodity information in the order-picking task. The user may know the current order-picking progress in real time by accessing the server.

In an example embodiment of the present disclosure, once finishing picking a commodity, the order-picking terminal may stop a prompt apparatus corresponding to the commodity from sending a prompt signal. For example, when a commodity indicated by one piece of commodity information in the order-picking task has been picked, a prompt stop instruction is sent to the prompt apparatus corresponding to the commodity indicated by the commodity information. The prompt stop instruction may be a response packet. The response packet may include no substantial content, but only include characters that may indicate a packet type. For example, the order-picking terminal may send a Response packet to the prompt apparatus, and "Response" may be filled in a character string indicating a packet type in the packet. As such, the prompt apparatus may stop sending the prompt signal when receiving the Response packet.

In this example embodiment, the order-picking terminal may send the prompt stop instruction to the prompt apparatus via a wireless network. The wireless network may include, for example, Wi-Fi, ZigBee, Bluetooth, Z-wave, and other wireless communication manners. Moreover, the order-picking terminal may also send the prompt stop instruction to the prompt apparatus via infrared.

In this example embodiment, the prompt apparatus may send more than one prompt signal at the same time, to inform different order pickers of respective commodities that need to be picked. In this case, after an order picker completes an order-picking process of a commodity indicated by a piece of commodity information, the prompt stop instruction sent to the prompt apparatus may further include the prompt information. As such, after receiving the prompt stop instruction, the prompt apparatus corresponding to the commodity indicated by the commodity information may stop sending the prompt signal consistent with the prompt manner defined in the prompt information according to the prompt information. As such, when an order picker completes the order-picking process of the commodity, only the prompt signal for reminding the order picker himself/herself is turned off on the prompt apparatus of the commodity, while prompt signals for reminding other order pickers are kept unchanged. As such, it may be ensured that different order pickers may perform respective order-picking processes orderly.

In an example embodiment of the present disclosure, the order-picking terminal and the prompt apparatus may be both provided with a Near Field Communication (NFC) module. An effective communication distance of the NFC module is generally within 10 cm. Therefore, when the order-picking terminal needs to communicate with the prompt apparatus, the communication process may be implemented by touching. For example, when needing to send a prompt stop instruction to the prompt apparatus, the order-picking terminal may touch the prompt apparatus corresponding to the commodity indicated by the commodity information, to send a prompt stop instruction to the NFC module of the prompt apparatus corresponding to the commodity indicated by the commodity information by using the NFC module of the order-picking terminal. Definitely, during the actual application, touching the prompt apparatus with the order-picking terminal is just for ensuring the effectiveness of communication. In fact, the prompt stop instruction may also be transmitted when the order-picking terminal is close enough to the prompt apparatus without touching the prompt apparatus. Therefore, the touch involved in the present disclosure merely indicates that the order-picking terminal and the prompt apparatus are close enough to each other but does not mean that they must touch each other.

In an example embodiment of the present disclosure, the order-picking terminal may not send the prompt stop instruction to the prompt apparatus directly but send the prompt stop instruction to the prompt apparatus through the server. For example, when a commodity indicated by one piece of commodity information in the order-picking task has been picked, a prompt stop request may be sent to the server. The prompt stop request may include the commodity information, such that the server sends a prompt stop instruction to the prompt apparatus corresponding to the commodity indicated by the commodity information. In this example embodiment, in order to avoid affecting normal order-picking processes of other order pickers, the prompt stop instruction may include the prompt information, such that the prompt apparatus corresponding to the commodity indicated by the commodity information stops sending a prompt signal consistent with the prompt manner. The prompt signals used for reminding other order pickers may be kept unchanged, to ensure that the order-picking process proceeds smoothly.

In an example embodiment of the present disclosure, the prompt signals sent by the prompt apparatuses corresponding to the commodities may be turned off uniformly when the commodities indicated by all pieces of commodity information in the order-picking task all have been picked. For example, the prompt stop instruction is sent to the prompt apparatuses corresponding to the commodities indicated by all the pieces of commodity information only when the commodities indicated by all the pieces of commodity information in the order-picking task all have been picked. Likewise, in order to avoid affecting normal order-picking processes of other order pickers, the prompt stop instruction may include the prompt information, such that the prompt apparatus corresponding to the commodity indicated by the commodity information stops sending a prompt signal consistent with the prompt manner. The prompt signals used for reminding other order pickers may be kept unchanged, to ensure that the order-picking process proceeds smoothly.

In an example embodiment of the present disclosure, the order-picking terminal and the prompt apparatus may both be provided with an NFC module. As such, when needing to communicate with the prompt apparatus, the order-picking terminal may touch the prompt apparatus to implement the communication process. For example, the order-picking terminal may touch the prompt apparatuses corresponding to the commodities indicated by all pieces of commodity information sequentially, to send a prompt stop instruction to the prompt apparatuses corresponding to the commodities indicated by all the pieces of commodity information. Likewise, during the actual application, touching the prompt apparatus with the order-picking terminal is just for ensuring the effectiveness of communication. In fact, the prompt stop instruction may also be transmitted when the order-picking terminal is close enough to the prompt apparatus without touching the prompt apparatus. Therefore, the touch involved in the present disclosure merely indicates that the order-picking terminal and the prompt apparatus are close enough to each other but does not mean that they must touch each other.

In an example embodiment of the present disclosure, the prompt stop instruction may be sent to the prompt apparatus by using the server. For example, when the commodities indicated by all pieces of commodity information in the order-picking task have been picked, a prompt stop request may be sent to the server, such that the server sends the prompt stop instruction to the prompt apparatuses corresponding to the commodities indicated by all the pieces of commodity information. In this case, the prompt signals sent by prompt information corresponding to all the commodities involved in the order-picking task are turned off. Therefore, it is unnecessary for the prompt stop instruction to include the commodity information of all the commodities. After receiving the prompt stop request sent by the order-picking terminal, the server may acquire the order-picking task corresponding to the order-picking terminal, so as to send the prompt stop instruction to the prompt apparatuses corresponding to the commodities in the order-picking task. Likewise, in order to avoid affecting normal order-picking processes of other order pickers, the prompt stop instruction may include the prompt information, such that the prompt apparatus corresponding to the commodity indicated by the commodity information stops sending a prompt signal consistent with the prompt manner. The prompt signals used for reminding other order pickers may be kept unchanged, to ensure that the order-picking process proceeds smoothly.

Figure 7:
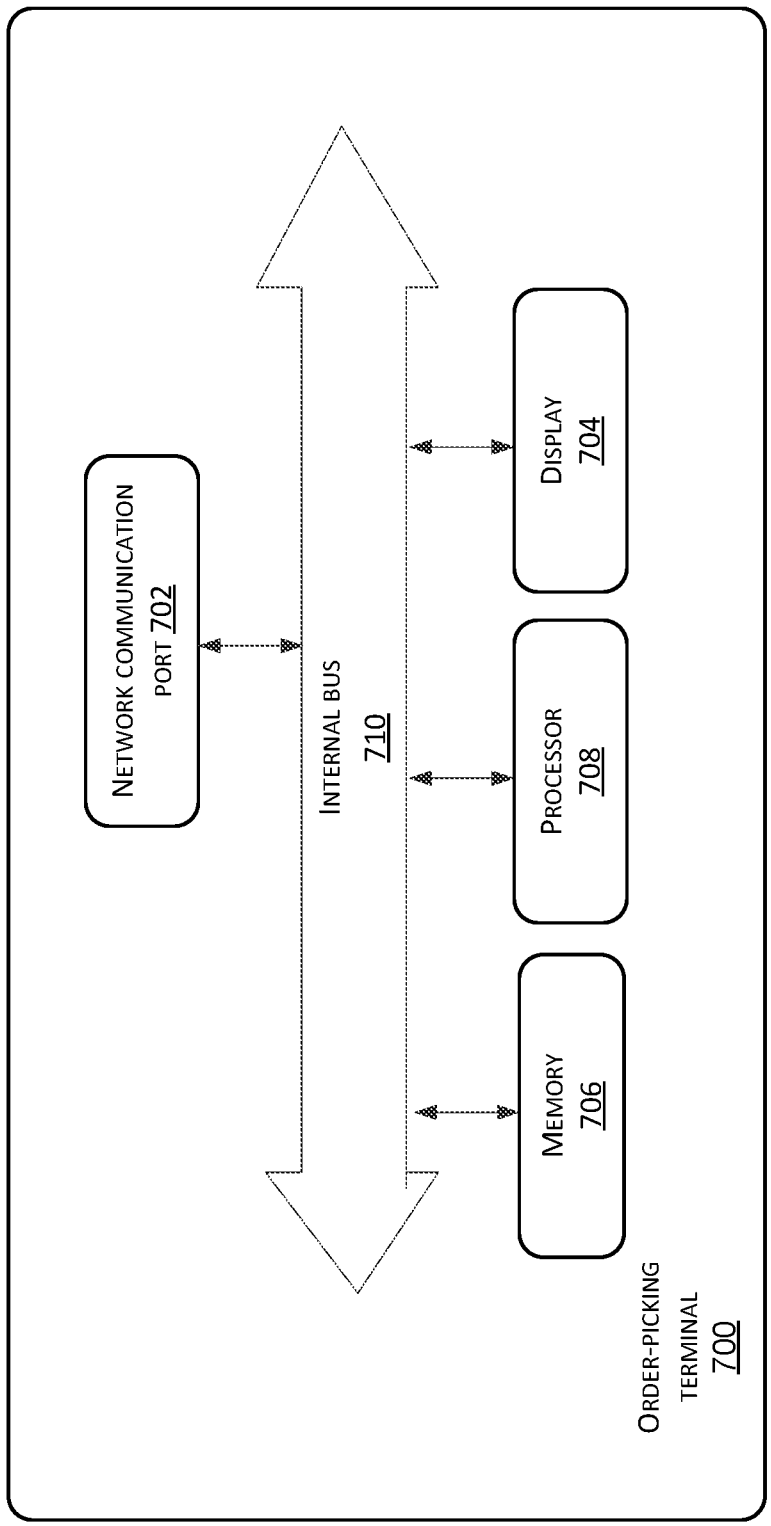
FIG. 7 is a schematic structural diagram of an order-picking terminal according to an example embodiment of the present invention.

Referring to FIG. 7, the present disclosure further provides an order-picking terminal 700. The order-picking terminal 700 includes a network communication port 702, a display 704, a memory 706, a processor 708, and an internal bus 710, wherein:

the network communication port 702 is configured to receive an order-picking task, wherein the order-picking task includes at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information;

the display 704 is configured to display the commodity information and the prompt information; and the memory 706 is configured to store the order-picking task.

In this example embodiment, the network communication terminal 111 may be a virtual port that is bound with different communication protocols and capable of sending or receiving different data. For example, the network communication port may be a No. 80 port responsible for web data communication, a No. 21 port responsible for FTP data communication, or a No. 25 port responsible for mail data communication. Moreover, the network communication port may also be a physical communication interface or communication chip. For example, the network communication port may be a wireless mobile network communication chip, such as a GSM and a CDMA, and may also be a Wi-Fi chip or a Bluetooth chip.

In this example embodiment, the memory 706 may be a memory device for storing information. In a digital system, a device capable of storing binary data may be a memory. In an integrated circuit, a circuit without a physical form but having a storage function may also be a memory, such as a RAM and a FIFO. In a system, a storage device having a physical form may also be referred to as a memory, such as a memory bank and a TF card.

In this example embodiment, the display 704 may be a display tool that displays a certain electronic file on a screen through a specific transmission device and then reflects the electronic file to human eyes. The display may include a liquid crystal display (LCD) screen, a cathode-ray tube (CRT) display screen, a light-emitting diode (LED) display screen, or the like.

Specific functions implemented by the order-picking terminal disclosed in the above implementation may be explained with reference to the implementation of the order-picking task processing method of the present disclosure. The order-picking terminal may realize the implementation of the order-picking task processing method of the present disclosure and achieve the technical effect of the method implementation.

Figure 8:
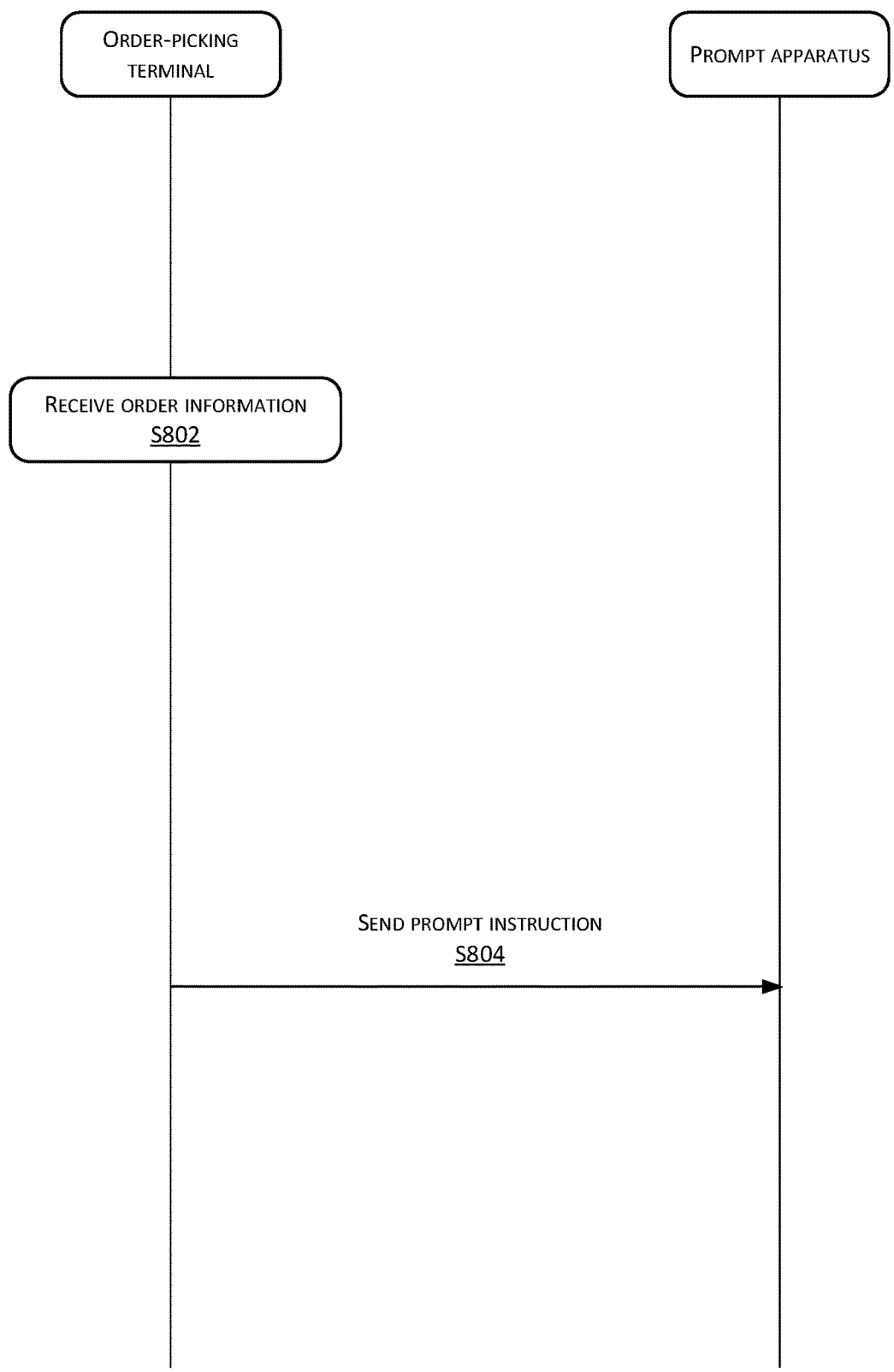
FIG. 8 is a flowchart of an order-picking task processing method according to an example embodiment of the present disclosure.

Referring to FIG. 8, the present disclosure further provides an order-picking task processing method, the method may be applied to an order-picking terminal of a physical store, and the physical store is provided with prompt apparatuses corresponding to commodities for sale. When executing the method, the order-picking terminal may implement the following steps.

S802: An order-picking task is received, the order-picking task including at least one commodity identifier.

In this example embodiment, the order-picking task may be sent by the server or by the management server. The order-picking task may be a character string compiled according to a preset rule. The preset rule may define fields included in the character string and an arrangement rule of the fields. For example, the order-picking task may include a commodity identifier field. The commodity identifier field may be filled with a commodity identifier of at least one commodity selected by the user. The commodity identifier of the at least one commodity may be used for informing an order picker using the order-picking terminal of the commodity that needs to be picked. In this example embodiment, the commodity identifier may point to a commodity sold in the physical store. For example, that the commodity identifier points to the commodity may indicate that the commodity identifier is associated with information of the commodity. The information of the commodity may include, for example, a region of the physical store where the commodity is located, a number of a shelf where the commodity is located, an identifier of a corresponding prompt apparatus, and the like.

S804: A prompt instruction is sent via a network such as a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

In this example embodiment, the order-picking terminal and the prompt apparatus corresponding to the commodity may communicate with each other via a wireless network. The wireless network may include, for example, Wi-Fi, Bluetooth, ZigBee, NFC, Z-wave, 2G/3G/4G, and other communication manners.

In this example embodiment, different wireless communication forms generally correspond to different coverage. For example, the coverage of Wi-Fi is much larger than the coverage of Bluetooth. Therefore, a distance issue needs to be considered when the order-picking terminal sends the prompt instruction to the prompt apparatus. For example, if Wi-Fi is adopted for communication, the order-picking terminal may send the prompt instruction to the prompt apparatus at any time as long as the order-picking terminal is in the physical store. However, if Bluetooth is adopted for communication, the order-picking terminal may establish a connection with the prompt apparatus to send the prompt instruction only when they are close to each other.

Moreover, different wireless communication forms will affect implementation costs of the present disclosure. For example, a currently mature prompt apparatus is generally provided with a wireless communication module. For example, a Wi-Fi communication chip or an NFC communication module is generally integrated in an electronic price tag. Therefore, when the technical solution of the present disclosure is implemented, a wireless communication form corresponding to the wireless communication module built in the prompt apparatus may be used. As such, the structure of the prompt apparatus does not need to be changed, thus reducing the costs of implementing the technical solution of the present disclosure.

In this example embodiment, the prompt instruction may be merely a request packet. The request packet may include no substantial content, but only include characters that may indicate a packet type. For example, the order-picking terminal may send a Request packet to a prompt apparatus corresponding to a to-be-picked commodity, and "request" may be filled in a character string indicating a packet type in the packet. As such, when receiving the Request packet, the prompt apparatus may send a prompt signal, to facilitate the order picker using the order-picking terminal to find the commodity corresponding to the prompt apparatus.

In this example embodiment, the prompt signal may be a signal used for drawing attention of the order picker. For example, the prompt signal may include at least one of a sound prompt, a vibration prompt, and a light prompt. It should be noted that, in an actual application scenario, the prompt apparatus may send prompt signals in different manners at the same time. For example, the prompt apparatus may flash a red light, flash a yellow light, or buzz. As such, when sending the prompt instruction to the prompt apparatus corresponding to the to-be-picked commodity, the order-picking terminal may further designate a manner of the sent prompt signal. In this example embodiment, the prompt instruction may further include a prompt signal identifier, the prompt signal identifier being used for representing a prompt manner of the prompt signal, such that the prompt apparatus sends a prompt signal consistent with the prompt manner.

In an example embodiment of the present disclosure, the order-picking terminal may receive an input commodity identifier during order-picking. The commodity identifier may be input to the order-picking terminal by the order picker. For example, the order picker may input a number of the commodity to the order-picking terminal to indicate that the commodity has been picked. Moreover, the order-picking terminal may further be provided with a module for scanning a commodity identifier. As such, a coded pattern such as a bar code or a QR code carrying the commodity identifier may be scanned by using the module, and the commodity identifier may be automatically recognized. Therefore, the commodity identifier may be input to the order-picking terminal automatically after being recognized.

In this example embodiment, after the commodity identifier is input, the order-picking terminal may compare the input commodity identifier with the commodity information in the order-picking task stored locally. When the input commodity identifier matches one piece of commodity information in the order-picking task, it indicates that order-picking of the commodity indicated by the commodity identifier may be completed. If the two are inconsistent with each other, it indicates that the commodity indicated by the input commodity identifier is not the commodity that needs to be picked by the order picker.

In an example embodiment of the present disclosure, after the commodity indicated by the commodity identifier has been picked, the order-picking terminal may determine whether commodities indicated by all commodity identifiers in the order-picking task all have been picked. If yes, it indicates that order-picking processes of all the commodities in the order-picking task have been completed. In this case, a task complete prompt may be sent to the server. If there is a commodity whose order-picking process is not completed, the order-picking process may be continued.

In an example embodiment of the present disclosure, the order-picking terminal may synchronize the order-picking progress with the server. As such, when the order picker carries out order-picking, a user may know the current order-picking progress in real time by accessing the server. For example, after the commodity indicated by the commodity identifier has been picked, the order-picking terminal may send the commodity identifier to the server to inform the server that the commodity indicated by the commodity identifier has been picked. As such, the server may update an order-picking state of each commodity identifier in the order-picking task. The user may acquire a current order-picking progress in real time by accessing the server.

In an example embodiment of the present disclosure, once finishing picking a commodity, the order-picking terminal may use a wireless network to stop a prompt apparatus corresponding to the commodity from sending a prompt signal. For example, when a commodity indicated by a commodity identifier in the order-picking task has been picked, the order-picking terminal may use the wireless network to send a prompt stop instruction to the prompt apparatus corresponding to the commodity indicated by the commodity identifier. The prompt stop instruction may be a response packet. The response packet may include no substantial content, but only include characters that may indicate a packet type. For example, the order-picking terminal may send a Response packet to the prompt apparatus, and "Response" may be filled in a character string indicating a packet type in the packet. As such, the prompt apparatus may stop sending the prompt signal when receiving the Response packet.

In an example embodiment of the present disclosure, the prompt signals sent by the prompt apparatuses corresponding to the commodities may be turned off uniformly when the commodities indicated by all the commodity identifiers in the order-picking task have been picked. For example, only when the commodities indicated by all the commodity identifiers in the order-picking task all have been picked, a prompt stop instruction is sent via the wireless network to the prompt apparatuses corresponding to the commodities indicated by all the commodity identifiers, such that the prompt apparatuses corresponding to the commodities indicated by all the commodity identifiers stop sending the prompt signal.

In an example embodiment of the present disclosure, a shelf where a commodity is located may sense addition or reduction of commodities in real time. Therefore, after the order picker completes order-picking and takes away a commodity, the shelf of the commodity may automatically send to the server a notification that the commodity has been picked. As such, the server performs data interaction with the shelf of commodities, so that states of commodities that have been picked may be updated in real time. In this example embodiment, the server may send real-time updated progress information to the order-picking terminal, the progress information carrying commodity identifiers of commodities that have been picked. As such, by checking the order-picking terminal, the order picker may determine commodities that have been picked and remaining commodities that need to be picked, thus that the order-picking process proceeds smoothly.

In an example embodiment of the present disclosure, when communicating with the prompt apparatus via Bluetooth, the order-picking terminal may send a Bluetooth broadcast according to the at least one commodity identifier, such that the prompt apparatus corresponding to the commodity indicated by the commodity identifier sends a prompt signal when receiving the commodity identifier of the corresponding commodity. For example, the order-picking terminal may send a Bluetooth broadcast according to the at least one commodity identifier. Each piece of information broadcast by the order-picking terminal to the external may carry one commodity identifier. A commodity identifier of a commodity bound with the prompt apparatus may be pre-stored in the prompt apparatus. As such, after receiving the information sent by the order-picking terminal through the Bluetooth broadcast, the prompt apparatus may compare the commodity identifier in the information with the commodity identifier stored in the prompt apparatus. When the two are consistent, it indicates that the order picker using the order-picking terminal needs to pick the commodity currently. At this point, the prompt apparatus may send a prompt signal to remind the order picker of the position where the commodity is located. When the commodity identifier in the information received by the prompt apparatus is inconsistent with the commodity identifier stored in the prompt apparatus, it indicates that the commodity corresponding to the prompt apparatus is not the commodity that needs to be picked by the order picker using the order-picking terminal. Therefore, the prompt apparatus may directly discard the received information.

Figure 9:
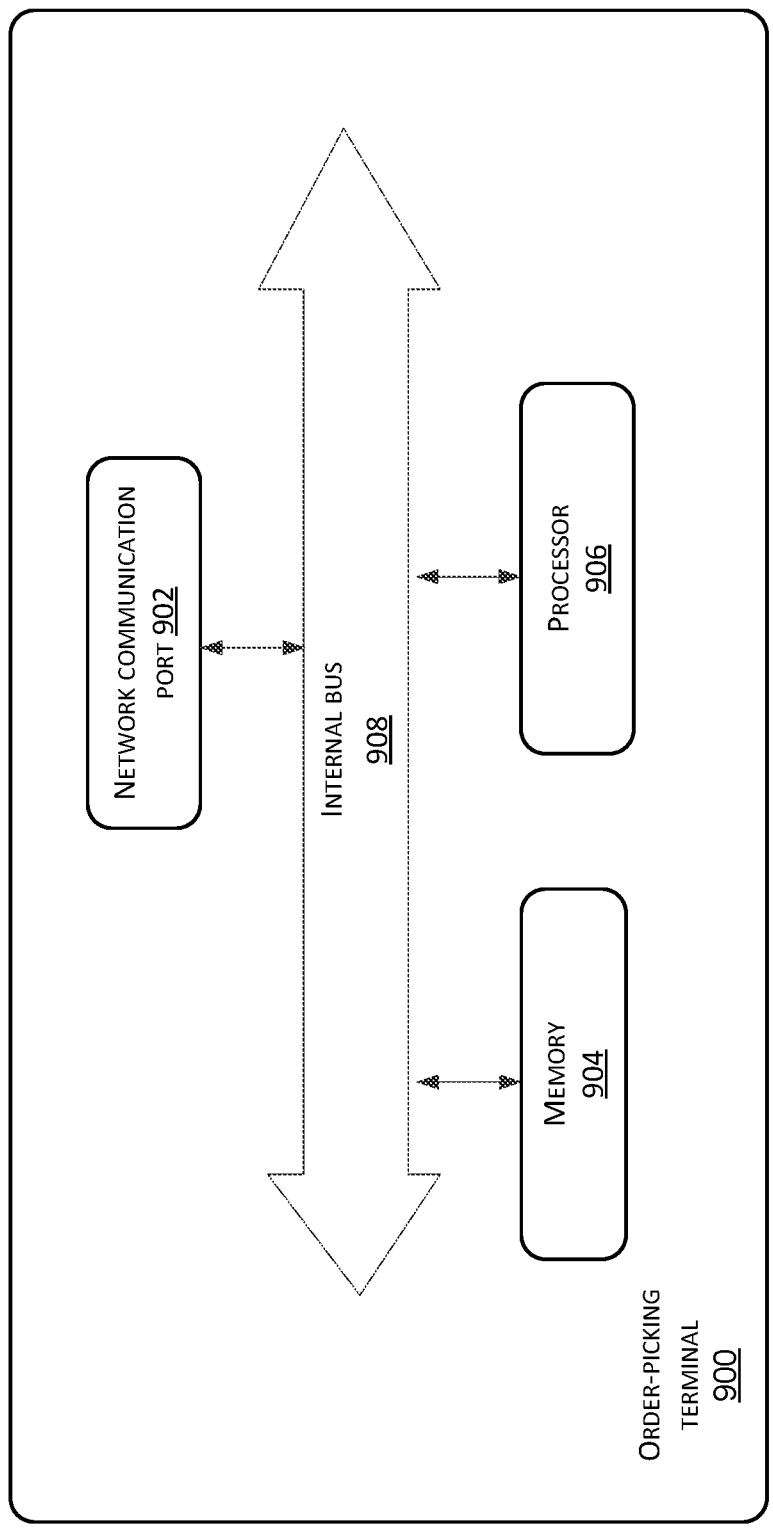
FIG. 9 is a schematic structural diagram of an order-picking terminal according to an example embodiment of the present invention.

Referring to FIG. 9, an example embodiment of the present disclosure further provides an order-picking terminal 900. The order-picking terminal includes a network communication port 902, a memory 904, a processor 906, and an internal bus 908.

The network communication port 902 is configured to conduct network data communication.

The memory 904 is configured to store a received order-picking task.

The processor 906 is configured to control the network communication port to receive an order-picking task, the order-picking task including at least one commodity identifier; and control the network communication port to send a prompt instruction via a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

In this example embodiment, the network communication port 902 may be a virtual port that is bound with different communication protocols and capable of sending or receiving different data. For example, the network communication port may be a No. 80 port responsible for web data communication, a No. 21 port responsible for FTP data communication, or a No. 25 port responsible for mail data communication. Moreover, the network communication port may also be a physical communication interface or communication chip. For example, the network communication port may be a wireless mobile network communication chip, such as a GSM and a CDMA, and may also be a Wi-Fi chip or a Bluetooth chip.

In this example embodiment, the memory 904 may be a memory device for storing information. In a digital system, a device capable of storing binary data may be a memory. In an integrated circuit, a circuit without a physical form but having a storage function may also be a memory, such as a RAM and a FIFO. In a system, a storage device having a physical form may also be referred to as a memory, such as a memory bank and a TF card.

The processor 906 may be implemented in any suitable manner. For example, the processor may be in the form of a microprocessor or a processor and a computer readable medium storing computer readable program codes (for example, software or firmware) executable by the (micro) processor, a logic gate, a switch, an Application Specific Integrated Circuit (ASIC), a programmable logic controller, and an embedded micro-controller. This is not limited in the present disclosure.

Specific functions implemented by the network communication port 902, the memory 904 and the processor 906 in the order-picking terminal disclosed in the above implementation may be explained with reference to the implementation of the order-picking task processing method of the present disclosure. The order-picking terminal may realize the implementation of the order-picking task processing method of the present disclosure and achieve the technical effect of the method implementation.

Figure 10:
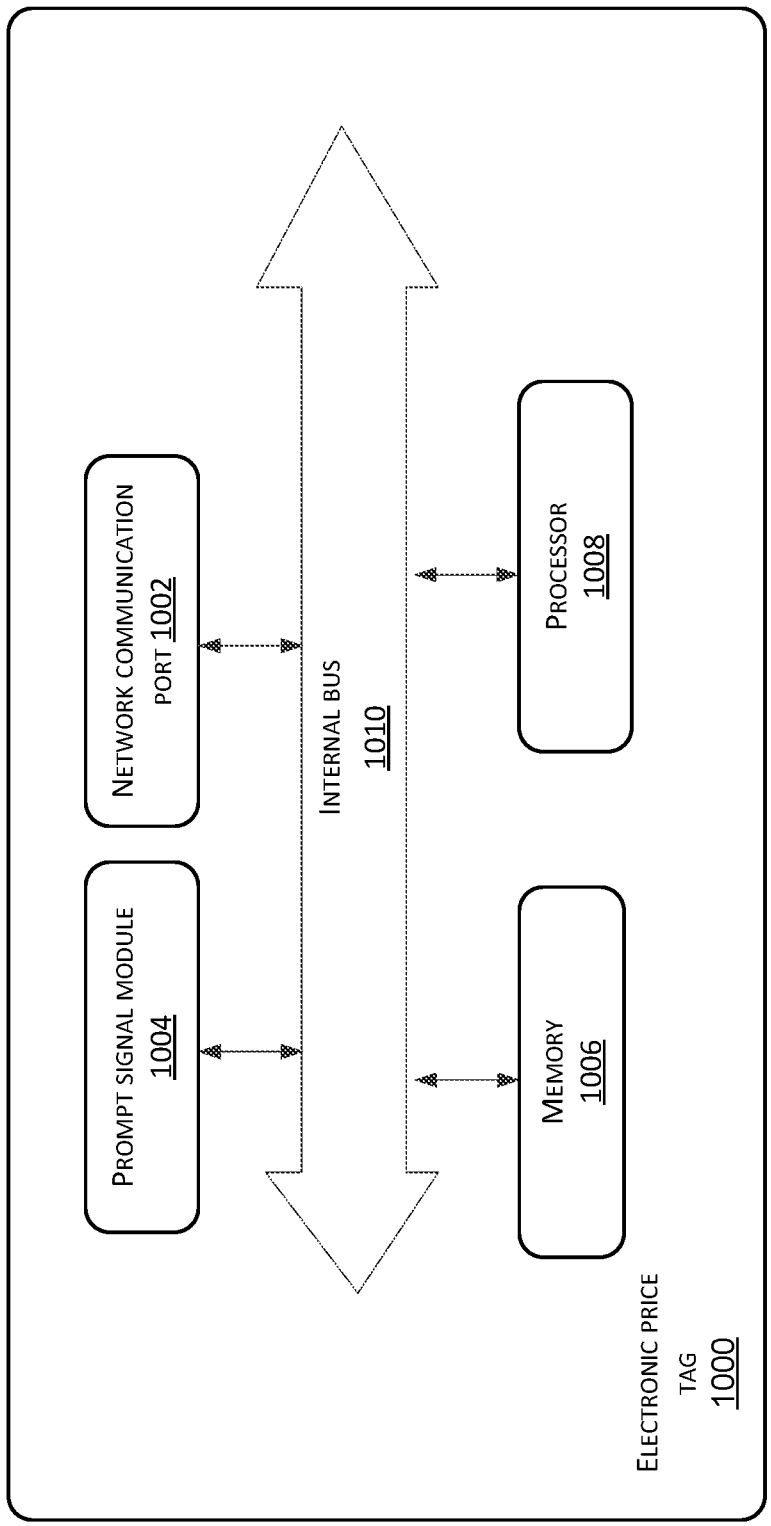
FIG. 10 is a schematic structural diagram of an electronic price tag according to an example embodiment of the present invention.

Referring to FIG. 10, an example embodiment of the present disclosure further provides an electronic price tag 1000. The electronic price tag 1000 may be applied to a physical store, and the electronic price tag is disposed at a commodity sold in the physical store. The electronic price tag includes a network communication module 1002, a prompt signal module 1004, a memory 1006, a processor 1008, and an internal bus 1010.

The network communication module 1002 is configured to receive a notification instruction sent by a server and receive a prompt instruction sent by an order-picking terminal.

The prompt signal module 1004 is configured to send a prompt signal.

The memory 1006 is configured to store the notification instruction.

The processor 1008 is configured to control the network communication module 1002 to receive the notification instruction sent by the server, and store the notification instruction to the memory 1006, the notification instruction including a commodity identifier; and control the prompt signal module 1004 to send a prompt signal when the prompt instruction that is sent by the order-picking terminal and received by the network communication module 1002 under control carries the commodity identifier.

In this example embodiment, the network communication module 1002 may be a virtual module that is bound with different communication protocols and capable of sending or receiving different data. For example, the network communication module may be a No. 80 port responsible for web data communication, a No. 21 port responsible for FTP data communication, or a No. 25 port responsible for mail data communication. Moreover, the network communication module may also be a physical communication interface or communication chip. For example, the network communication port may be a wireless mobile network communication chip, such as a GSM and a CDMA, and may also be a wireless communication module such as a Wi-Fi module, a ZigBee module, a Bluetooth module, and a Z-wave module.

In this example embodiment, the prompt signal module 1004 may be a component that may send a prompt signal. The prompt signal module 1004 may be an electronic device such as a display screen, an LED lamp, and a buzzer, or a combination of the foregoing electronic devices. The prompt signal may be a signal used for drawing attention of an order picker. For example, the prompt signal may include at least one of a sound prompt, a vibration prompt, and a light prompt.

In this example embodiment, the memory 1006 may be a memory device for storing information. In a digital system, a device capable of storing binary data may be a memory. In an integrated circuit, a circuit without a physical form but having a storage function may also be a memory, such as a RAM and a FIFO. In a system, a storage device having a physical form may also be referred to as a memory, such as a memory bank and a TF card.

The processor 1008 may be implemented in any suitable manner. For example, the processor may be in the form of a microprocessor or a processor and a computer readable medium storing computer readable program codes (for example, software or firmware) executable by the (micro) processor, a logic gate, a switch, an Application Specific Integrated Circuit (ASIC), a programmable logic controller, and an embedded micro-controller. This is not limited in the present disclosure.

In this example embodiment, the notification instruction sent by the server may be used for informing the prompt signal module of the electronic price tag to send a prompt signal. For example, after the user sends the order information to the server, the server may send a notification instruction to an electronic price tag corresponding to a commodity indicated by a commodity identifier according to the commodity identifier included in the order information and send an order-picking task including the commodity identifier to an order-picking terminal of an order picker. As such, during order-picking, the order picker may timely find the position of the commodity that needs to be picked according to the prompt signal sent by the electronic price tag.

In this example embodiment, the order-picking terminal may broadcast information to the external according to the commodity identifier in the order-picking task after receiving the order-picking task sent by the server. For example, the order-picking terminal may broadcast the prompt instruction including the commodity identifier through a Bluetooth module. As such, when receiving the prompt instruction sent by the order-picking terminal, the electronic price tag may compare the commodity identifier carried in the prompt instruction with the commodity identifier in the notification instruction stored in the electronic price tag. When the two commodity identifiers are consistent, it indicates that the order picker using the order-picking terminal needs to pick the commodity currently. At this point, the processor of the electronic price tag may control the prompt signal module to send a prompt signal to remind the order picker of the position where the commodity is located. When the commodity identifier in the prompt instruction received by the electronic price tag is inconsistent with the commodity identifier stored in the electronic price tag, it indicates that the commodity corresponding to the electronic price tag is not the commodity that needs to be picked by the order picker using the order-picking terminal. Therefore, the electronic price tag may directly discard the received information.

In an example embodiment of the present disclosure, the electronic price tag may have more than one prompt signal module at the same time. As such, the electronic price tag may send different prompt signals at the same time, to inform different order pickers of respective commodities that need to be picked. In this case, the notification instruction sent by the server to the electronic price tag may further include a prompt signal identifier. The prompt signal identifier may be used for representing a prompt manner of the prompt signal. As such, when the prompt instruction that is sent by the order-picking terminal and received by the network communication module under control carries the commodity identifier, the processor may control the prompt signal module to send a prompt signal consistent with the prompt manner. As such, a correct prompt signal may be provided to the order picker, to facilitate the order picker to complete the order-picking process.

In an example embodiment of the present disclosure, the prompt manner of the prompt signal that should be sent by the electronic price tag may further be determined by the order-picking terminal. For example, the prompt instruction sent by the order-picking terminal to the electronic price tag may further include a prompt signal identifier. Likewise, the prompt signal identifier may be used for representing a prompt manner of the prompt signal. As such, when the prompt instruction that is sent by the order-picking terminal and received by the network communication module under control carries the commodity identifier, the processor may further control the prompt signal module to send a prompt signal consistent with the prompt manner. As such, a correct prompt signal may also be provided to the order picker, to facilitate the order picker to complete the order-picking process.

In an example embodiment of the present disclosure, the processor is further configured to receive a prompt stop instruction sent by the server or the order-picking terminal and control the prompt signal module to stop sending the prompt signal when it is verified that the prompt stop instruction includes the commodity identifier. In this example embodiment, when the order picker completes an order-picking process of a commodity, or after the order picker completes order-picking processes of all commodities in the order-picking task, a prompt stop instruction may be sent to the electronic price tag of the commodity by using the order-picking terminal, such that the electronic price tag of the commodity stops sending the corresponding prompt signal. The prompt stop instruction may be a response packet. The response packet may include no substantial content, but only include characters that may indicate a packet type. For example, the order-picking terminal may send a Response packet to the electronic price tag, and "Response" may be filled in a character string indicating a packet type in the packet. As such, the electronic price tag may stop sending the prompt signal when receiving the Response packet. In this example embodiment, the prompt stop instruction may further include a commodity identifier of the commodity. As such, not all electronic price tags receiving the prompt stop instruction need to stop sending the prompt signal; instead, the electronic price tag stops sending the prompt signal only when it is verified that the prompt stop instruction includes the commodity identifier. For example, when verifying whether the prompt stop instruction includes the commodity identifier, the electronic price tag may compare the commodity identifier carried in the prompt stop instruction with the commodity identifier stored in the electronic price tag. When the two commodity identifiers are consistent with each other, it indicates that the verification succeeds, and the electronic price tag may stop sending the prompt signal. Otherwise, the prompt stop instruction may be discarded directly. As such, electronic price tags used for reminding other order pickers may send prompt signals normally, thus ensuring that the order-picking process proceeds normally.

In this example embodiment, the prompt stop instruction may also be sent by the server. For example, the order-picking terminal may not send the prompt stop instruction to the electronic price tag directly but send the prompt stop instruction to the electronic price tag through the server. For example, when a commodity indicated by a commodity identifier in the order-picking task has been picked, the order-picking terminal may send a prompt stop request to the server. The prompt stop request may include the commodity identifier, such that the server sends a prompt stop instruction to an electronic price tag corresponding to the commodity indicated by the commodity identifier.

In an example embodiment of the present disclosure, the prompt instruction may further include a prompt signal identifier, the prompt signal identifier being used for representing a prompt manner of the prompt signal. As such, the processor may further be configured to control the prompt signal module to stop sending the prompt signal consistent with the prompt manner when it is verified that the prompt stop instruction includes the commodity identifier. In this example embodiment, the electronic price tag may send more than one prompt signal at the same time, to inform different order pickers of respective commodities that need to be picked. In order to avoid affecting normal order-picking processes of other order pickers, the prompt stop instruction may include the corresponding prompt signal identifier, such that the electronic price tag of the commodity may stop sending a prompt signal consistent with the prompt manner defined by the prompt signal identifier. The prompt signals used for reminding other order pickers may be kept unchanged, to ensure that the order-picking process proceeds smoothly.

In an example embodiment of the present disclosure, the network communication module may include a Bluetooth module. The Bluetooth module may be configured to receive Bluetooth broadcast information sent by the order-picking terminal according to the commodity identifier. As such, the processor may be configured to control the prompt signal module to send a prompt signal when the received Bluetooth broadcast information carries the commodity identifier. In this example embodiment, the order-picking terminal may send a Bluetooth broadcast according to the commodity identifier. Each piece of information broadcast by the order-picking terminal to the external may carry the commodity identifier. The memory of the electronic price tag may store the notification instruction sent by the server. The notification instruction may also carry the commodity identifier. As such, after receiving the information sent by the order-picking terminal through the Bluetooth broadcast, the electronic price tag may compare the commodity identifier in the information with the commodity identifier stored in the electronic price tag. When the two commodity identifiers are consistent, it indicates that the order picker using the order-picking terminal needs to pick the commodity currently. At this point, the electronic price tag may send a prompt signal to remind the order picker of the position where the commodity is located. When the commodity identifier in the information received by the electronic price tag is inconsistent with the commodity identifier stored in the electronic price tag, it indicates that the commodity corresponding to the electronic price tag is not the commodity that needs to be picked by the order picker using the order-picking terminal. Therefore, the electronic price tag may directly discard the received information.

In an example embodiment of the present disclosure, the network communication module may further include an NFC module. As such, the processor may be configured to control the prompt signal module to stop sending the prompt signal when the electronic price tag touches the order-picking terminal. In this example embodiment, an effective communication distance of the NFC module is generally within 10 cm. Therefore, when needing to communicate with the electronic price tag, the order-picking terminal may touch the electronic price tag to implement the communication process. For example, when needing to send a prompt stop instruction to the electronic price tag, the order-picking terminal may touch the electronic price tag corresponding to the commodity indicated by the commodity information, to send a prompt stop instruction to the electronic price tag corresponding to the commodity indicated by the commodity information. Definitely, during the actual application, touching the electronic price tag with the order-picking terminal is just for ensuring the effectiveness of communication. In fact, the prompt stop instruction may also be transmitted when the order-picking terminal is close enough to the electronic price tag without touching the electronic price tag. Therefore, the touch involved in the present disclosure merely indicates that the order-picking terminal and the electronic price tag are close enough to each other but does not mean that they must touch each other.

As may be seen in the present disclosure that a prompt apparatus capable of sending a prompt signal is disposed at commodities for sale. As such, a server, upon receiving order information of a user, may send an order-picking task to an order-picking terminal of an order picker. At the same time, the server may send a prompt instruction to a prompt apparatus corresponding to a commodity included in the order information. The prompt apparatus corresponding to the to-be-picked commodity may send a prompt signal to remind the order picker of the position where the commodity is located. As such, the order picker may perform order-picking conveniently according to the prompt signal, and the efficiency of order-picking may be improved, thus improving the processing rate of order information.

In the 1990s, an improvement on a technology may be obviously distinguished as an improvement on hardware (for example, an improvement on a circuit structure such as a diode, a transistor, or a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it is improper to assume that an improvement of a method procedure cannot be implemented by using a hardware entity module. For example, a Programmable Logic Device (PLD) (such as a Field Programmable Gate Array (FPGA)) is such an integrated circuit whose logic functions are determined by devices programmed by a user. Designers program by themselves to "integrate" a digital system into a piece of PLD, without the need to ask a chip manufacturer to design and manufacture a dedicated integrated circuit chip. Moreover, at present, the programming is mostly implemented by using "logic compiler" software, instead of manually manufacturing an integrated circuit chip. The logic compiler software is similar to a software complier used for developing and writing a program, and an original code before compiling also needs to be written by using a specific programming language, which is referred to as a Hardware Description Language (HDL). There are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog2 are most commonly used now. Those skilled in the art also should know that a hardware circuit for implementing the logic method procedure may be easily obtained by slightly logically programming the method procedure using the above several hardware description languages and programming it into an integrated circuit.

Those skilled in the art also know that a client terminal or a server may be implemented by using pure computer readable program codes, and in addition, the method steps may be logically programmed to enable the client terminal or the server to implement the same function in the form of a logic gate, a switch, an ASIC, a programmable logic controller and an embedded microcontroller. Therefore, this type of client terminal or server may be considered as a hardware component, and apparatuses included in the client terminal or server for implementing various functions may also be considered as structures inside the hardware component. Or, the apparatuses used for implementing various functions may even be considered as both software modules for implementing the method and structures inside the hardware component.

Based on the foregoing descriptions of the example embodiments, those skilled in the art may clearly understand that the present disclosure may be implemented by software plus a necessary universal hardware platform. Based on such understanding, the technical solution of the present disclosure essentially, or the portion contributing to the prior art may be embodied in the form of a software product. The computer software product may be stored in a storage medium, such as a ROM/RAM, a magnetic disk, or an optical disc, and include several instructions that enable a computer device (which may be a personal computer, a server, a network device, or the like) to execute the methods in the example embodiments or in certain portions of the example embodiments of the present disclosure.

The memory is an example of the computer readable medium. The computer readable medium includes non-volatile and volatile media as well as movable and non-movable media, and may implement information storage by means of any method or technology. Information may be a computer readable instruction, a data structure, and a module of a program or other data. An example of the storage medium of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission medium, and may be used to store information accessible by the computing device. According to the definition in this text, the computer readable medium does not include transitory computer readable media (transitory media) such as a modulated data signal and carrier.

Various example embodiments in the specification are described in a progressive manner. For the same or similar parts between the example embodiments, reference may be made to one another. Each implementation focuses on a portion that is different from other example embodiments. Particularly, the example embodiments of the server, the order-picking terminal, and the electronic price tag may be explained with reference to the introductions of the example embodiments of the foregoing methods.

The present disclosure may be described in a common context of a computer executable instruction executed by a computer, for example, a program module. Generally, the program module includes a routine, a program, an object, an assembly, a data structure, and the like used for executing a specific task or implementing a specific abstract data type. The present disclosure may also be implemented in distributed computing environments. In the distributed computer environments, a task is executed by using remote processing devices connected through a communications network. In the distributed computer environments, the program module may be located in local and remote computer storage media including a storage device.

Although the present disclosure is described through example embodiments, those of ordinary skill in the art should know that the present disclosure has many variations and changes without departing from the spirit of the present disclosure. It is expected that the claims cover the variations and changes without departing from the spirit of the present disclosure.

The present disclosure may further he understood with clauses as follows.

Clause 1. An order processing method, comprising:
receiving order information, the order information comprising at least one commodity identifier;
sending an order-picking task to an order-picking terminal according to the order information, the order-picking task comprising commodity information corresponding to the commodity identifier; and
sending a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal.

Clause 2. The method of clause 1, wherein the step of sending an order-picking task to an order-picking terminal according to the order information comprises:
extracting the at least one commodity identifier from the order information, and sending an order-picking task carrying the at least one commodity identifier to the order-picking terminal.

Clause 3. The method of clause 1, wherein the step of sending an order-picking task to an order-picking terminal according to the order information comprises:
dividing the order information into at least one piece of sub-order information, wherein each piece of sub-order information comprises at least one commodity identifier, and the commodity identifiers in the same piece of sub-order information correspond to the same order-picking terminal; and
sending each piece of sub-order information as an order-picking task to the respective corresponding order-picking terminal.

Clause 4. The method of clause 1 or 3, wherein:
the order-picking task and the prompt instruction each comprise a prompt signal identifier, the prompt signal identifier being used for representing a prompt manner of the prompt signal, such that the prompt apparatus sends a prompt signal consistent with the prompt manner.

Clause 5. The method of clause 4, wherein prompt signal identifiers in order-picking tasks corresponding to different pieces of sub-order information are different.

Clause 6. The method of clause 1, wherein the step of sending an order-picking task to an order-picking terminal comprises:
determining a position corresponding to the order-picking task; and
sending the order-picking task to an order-picking terminal associated with the position.

Clause 7. The method of clause 1, wherein the step of sending an order-picking task to an order-picking terminal comprises:
determining a position corresponding to the order-picking task; and
determining an order-picking terminal closest to the position from at least one order-picking terminal, and sending the order-picking task to the determined order-picking terminal.

Clause 8. The method of clause 7, wherein the step of sending the order-picking task to the determined order-picking terminal comprises:
determining whether the determined order-picking terminal is available; and sending the order-picking task to the determined order-picking terminal only when the determined order-picking terminal is available.

Clause 9. The method of clause 1, wherein the prompt signal comprises at least one of a sound prompt, a vibration prompt, and a light prompt.

Clause 10. The method of clause 1, further comprising:
receiving an order-picking complete instruction sent by the order-picking terminal, and sending a prompt stop instruction to the prompt apparatus corresponding to the commodity indicated by the commodity identifier in the order information, such that the prompt apparatus stops sending the prompt signal.

Clause 11. The method of clause 10, wherein the prompt stop instruction comprises a prompt signal identifier, the prompt signal identifier being used for representing a prompt manner of the prompt signal, such that the prompt apparatus stops sending the prompt signal consistent with the prompt manner.

Clause 12. The method of clause 1, wherein the prompt apparatus is connected to a management server; and correspondingly, the step of sending a prompt instruction to a prompt apparatus corresponding to the commodity identifier comprises:
sending the commodity identifier in the order information to the management server, such that the management server sends a prompt instruction to a prompt apparatus corresponding to a commodity indicated by the commodity identifier in the order information.

Clause 13. A server, comprising a network communication port, a memory, and a processor, wherein
the network communication port is configured to conduct network data communication;
the memory is configured to store received order information; and
the processor is configured to control the network communication port to receive order information, the order information comprising at least one commodity identifier; control the network communication port to send an order-picking task to an order-picking terminal according to the order information, the order-picking task comprising commodity information corresponding to the commodity identifier; and control the network communication port to send a prompt instruction to a prompt apparatus corresponding to the commodity identifier, such that the prompt apparatus sends a prompt signal to facilitate an order picker using the order-picking terminal to determine a commodity corresponding to the commodity identifier according to the prompt signal.

Clause 14. An order-picking task processing method, comprising:
receiving an order-picking task, wherein the order-picking task comprises at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information.

Clause 15. The method of clause 14, further comprising:
receiving an input commodity identifier; and
indicating that a commodity indicated by one piece of commodity information in the order-picking task has been picked when the input commodity identifier matches the commodity information.

Clause 16. The method of clause 15, wherein after the commodity indicated by the commodity information has been picked, the method further comprises:
determining whether commodities indicated by all pieces of commodity information in the order-picking task all have been picked; and sending a task complete prompt to a server if the commodities all have been picked.

Clause 17. The method of clause 15, wherein after the commodity indicated by the commodity information has been picked, the method further comprises:
sending the commodity information to a server to inform the server that the commodity indicated by the commodity information has been picked.

Clause 18. The method of clause 15, further comprising:
when a commodity indicated by one piece of commodity information in the order-picking task has been picked, sending a prompt stop instruction to a prompt apparatus corresponding to the commodity indicated by the commodity information, the prompt stop instruction comprising the prompt information, such that the prompt apparatus corresponding to the commodity indicated by the commodity information stops sending a prompt signal consistent with the prompt manner.

Clause 19. The method of clause 18, wherein the order-picking terminal and the prompt apparatus each comprise a near field communication module; and correspondingly, the step of sending a prompt stop instruction to a prompt apparatus corresponding to the commodity indicated by the commodity information comprises:
touching the order-picking terminal with the prompt apparatus corresponding to the commodity indicated by the commodity information, to send a prompt stop instruction to the near field communication module of the prompt apparatus corresponding to the commodity indicated by the commodity information by using the near field communication module of the order-picking terminal.

Clause 20. The method of clause 15, further comprising:
when a commodity indicated by one piece of commodity information in the order-picking task has been picked, sending a prompt stop request to a server, the prompt stop request comprising the commodity information, such that the server sends a prompt stop instruction to a prompt apparatus corresponding to the commodity indicated by the commodity information, wherein the prompt stop instruction comprises the prompt information, such that the prompt apparatus corresponding to the commodity indicated by the commodity information stops sending a prompt signal consistent with the prompt manner.

Clause 21. The method of clause 15, further comprising:
when commodities indicated by all pieces of commodity information in the order-picking task all have been picked, sending a prompt stop instruction to prompt apparatuses corresponding to the commodities indicated by all the commodity information, the prompt stop instruction comprising the prompt information, such that the prompt apparatuses corresponding to the commodities indicated by all the commodity information stop sending a prompt signal consistent with the prompt manner.

Clause 22. The method of clause 21, wherein the step of sending a prompt stop instruction to prompt apparatuses corresponding to the commodities indicated by all the commodity information comprises:
touching the order-picking terminal with the prompt apparatuses corresponding to the commodities indicated by all the commodity information sequentially, to send the prompt stop instruction to the prompt apparatuses corresponding to the commodities indicated by all the commodity information.

Clause 23. The method of clause 15, further comprising:
when commodities indicated by all pieces of commodity information in the order-picking task all have been picked, sending a prompt stop request to a server, such that the server sends a prompt stop instruction to prompt apparatuses corresponding to the commodities indicated by all the commodity information, wherein the prompt stop instruction comprises the prompt information, such that the prompt apparatuses corresponding to the commodities indicated by all the commodity information stop sending a prompt signal consistent with the prompt manner.

Clause 24. An order-picking terminal, comprising a network communication port, a display screen, and a memory, wherein
the network communication port is configured to receive an order-picking task, wherein the order-picking task comprises at least one piece of commodity information and prompt information; the at least one piece of commodity information is used for informing an order picker using the order-picking terminal of a commodity that needs to be picked; and the prompt information represents a prompt manner of a prompt apparatus corresponding to the commodity indicated by the commodity information;
the display screen is configured to display the commodity information and the prompt information; and
the memory is configured to store the order-picking task.

Clause 25. An order-picking task processing method, comprising:
receiving an order-picking task, the order-picking task comprising at least one commodity identifier; and
sending a prompt instruction via a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

Clause 26. The method of clause 25, further comprising:
receiving an input commodity identifier; and
indicating that a commodity indicated by one commodity identifier in the order-picking task has been picked when the input commodity identifier matches the commodity identifier.

Clause 27. The method of clause 26, wherein after the commodity indicated by the commodity identifier has been picked, the method further comprises:
determining whether commodities indicated by all commodity identifiers in the order-picking task all have been picked; and sending a task complete prompt to a server if the commodities all have been picked.

Clause 28. The method of clause 26, wherein after the commodity indicated by the commodity identifier has been picked, the method further comprises:

sending the commodity identifier to a server to inform the server that the commodity indicated by the commodity identifier has been picked.

Clause 29. The method of clause 25, further comprising:
when a commodity indicated by one commodity identifier in the order-picking task has been picked, sending a prompt stop instruction via the wireless network to a prompt apparatus corresponding to the commodity indicated by the commodity identifier, such that the prompt apparatus corresponding to the commodity indicated by the commodity identifier stops sending the prompt signal.

Clause 30. The method of clause 25, further comprising:
when commodities indicated by all commodity identifiers in the order-picking task all have been picked, sending a prompt stop instruction via the wireless network to prompt apparatuses corresponding to the commodities indicated by all the commodity identifiers, such that the prompt apparatuses corresponding to the commodities indicated by all the commodity identifiers stop sending the prompt signal.

Clause 31. The method of clause 25, further comprising:
receiving progress information sent by the server, the progress information carrying a commodity identifier of a commodity that has been picked.

Clause 32. The method of clause 25, wherein the step of sending a prompt instruction via a wireless network to a prompt apparatus corresponding to a commodity indicated by the at least one commodity identifier comprises:
sending a Bluetooth broadcast according to the at least one commodity identifier, such that the prompt apparatus corresponding to the commodity indicated by the commodity identifier sends a prompt signal when receiving the commodity identifier of the corresponding commodity.

Clause 33. An order-picking terminal, comprising a network communication port, a memory, and a processor, wherein
the network communication port is configured to conduct network data communication;
the memory is configured to store a received order-picking task; and
the processor is configured to control the network communication port to receive the order-picking task, the order-picking task comprising at least one commodity identifier; and control the network communication port to send a prompt instruction via a wireless network to a prompt apparatus corresponding to a commodity indicated by the at least one commodity identifier, such that the prompt apparatus corresponding to the commodity sends a prompt signal to facilitate an order picker using the order-picking terminal to find the commodity.

Clause 34. An electronic price tag, comprising a network communication module, a prompt signal module, a memory, and a processor, wherein
the network communication module is configured to receive a notification instruction sent by a server and receive a prompt instruction sent by an order-picking terminal;
the prompt signal module is configured to send a prompt signal;
the memory is configured to store the notification instruction; and
the processor is configured to control the network communication module to receive the notification instruction sent by the server, and store the notification instruction to the memory, the notification instruction comprising a commodity identifier; and control the prompt signal module to send a prompt signal when the prompt instruction that is sent by the order-picking terminal and received by the network communication module under control carries the commodity identifier.

Clause 35. The electronic price tag of clause 34, wherein the notification instruction further comprises a prompt signal identifier, the prompt signal identifier being used for representing a prompt manner of the prompt signal; and correspondingly, the processor is further configured to control the prompt signal module to send a prompt signal consistent with the prompt manner when the prompt instruction that is sent by the order-picking terminal and received by the network communication module under control carries the commodity identifier.

Clause 36. The electronic price tag of clause 34, wherein the prompt instruction further comprises a prompt signal identifier, the prompt signal identifier being used for representing a prompt manner of the prompt signal; and correspondingly, the processor is further configured to control the prompt signal module to send a prompt signal consistent with the prompt manner when the prompt instruction that is sent by the order-picking terminal and received by the network communication module under control carries the commodity identifier.

Clause 37. The electronic price tag of clause 34, wherein the processor is further configured to receive a prompt stop instruction sent by the server or the order-picking terminal and control the prompt signal module to stop sending the prompt signal when it is verified that the prompt stop instruction comprises the commodity identifier.

Clause 38. The electronic price tag of clause 37, wherein the prompt stop instruction further comprises a prompt signal identifier, the prompt signal identifier being used for representing a prompt manner of the prompt signal; and correspondingly, the processor is further configured to control the prompt signal module to stop sending a prompt signal consistent with the prompt manner after it is verified that the prompt stop instruction comprises the commodity identifier.

Clause 39. The electronic price tag of clause 34, wherein the network communication module comprises a Bluetooth module, the Bluetooth module being configured to receive Bluetooth broadcast information sent by the order-picking terminal according to the commodity identifier; and correspondingly, the processor is configured to control the prompt signal module to send the prompt signal when the received Bluetooth broadcast information carries the commodity identifier.

Clause 40. The electronic price tag of clause 34, wherein the network communication module comprises a near field communication module; and correspondingly, the processor is configured to control the prompt signal module to stop sending the prompt signal when the electronic price tag touches the order-picking terminal.

What is claimed is:
1. A method comprising:
receiving order information by a server, the order information including at least one commodity identifier;
sending, by the server, an order-picking task to an order-picking terminal according to the order information, the order-picking task including commodity information corresponding to the at least one commodity identifier; and
sending, by the server, a prompt instruction to a prompt apparatus corresponding to the at least one commodity identifier to cause the prompt apparatus to send a prompt signal to determine at least one commodity corresponding to the at least one commodity identifier, the prompt signal including a light prompt, a sound prompt, or a vibration prompt, the sending including instructing the prompt apparatus to send different prompt signals for different sub-order information of the order information, wherein the order-picking task includes a prompt signal identifier and the prompt instruction includes the prompt signal identifier, the prompt signal identifier representing a prompt manner of the prompt signal such that the prompt apparatus sends a prompt signal consistent with the prompt manner; and wherein the prompt apparatus flashes a light or buzz a buzzer.

2. The method of claim 1, wherein the prompt signal facilitates an order picker using the order-picking terminal to determine the at least one commodity corresponding to the at least one commodity identifier according to the prompt signal.

3. The method of claim 1, wherein the sending the order-picking task to the order-picking terminal according to the order information includes:
extracting the at least one commodity identifier from the order information; and
sending the order-picking task carrying the at least one commodity identifier to the order-picking terminal.

4. The method of claim 1, wherein the sending the order-picking task to the order-picking terminal according to the order information includes:
dividing the order information into multiple pieces of sub-order information, a respective piece of sub-order information including one or more commodity identifiers, and the one or more commodity identifiers in the respective piece of sub-order information corresponding to the order-picking terminal; and
sending the respective piece of sub-order information as the order-picking task to the order-picking terminal.

5. The method of claim 1, wherein prompt signal identifiers in order-picking tasks corresponding to different pieces of sub-order information are different.

6. The method of claim 1, wherein the sending the order-picking task to an order-picking terminal includes:
determining a position corresponding to the order-picking task; and
sending the order-picking task to an order-picking terminal associated with the position.

7. The method of claim 1, wherein the sending the order-picking task to the order-picking terminal includes:
determining a position of the at least one commodity corresponding to the order-picking task;
determining an order-picking terminal closest to the position of the commodity; and
sending the order-picking task to the determined order-picking terminal.

8. The method of claim 1, further comprising:
receiving an order-picking complete instruction sent by the order-picking terminal; and
sending a prompt stop instruction to the prompt apparatus corresponding to the commodity indicated by the commodity identifier in the order information to cause the prompt apparatus to stop sending the prompt signal.

9. The method of claim 8, wherein the prompt stop instruction includes the prompt signal identifier, so that the prompt apparatus stops sending the prompt signal consistent with the prompt manner.

10. The method of claim 1, wherein:
the prompt apparatus is connected to a management server; and
the sending the prompt instruction to the prompt apparatus corresponding to the commodity identifier includes:
sending the commodity identifier in the order information to the management server to cause the management server to send the prompt instruction to the prompt apparatus corresponding to the commodity indicated by the commodity identifier in the order information.

11. A method comprising:
receiving an order-picking task, the order-picking task including at least one piece of commodity information and prompt information, the at least one piece of commodity information being used for informing an order-picking terminal of a commodity that needs to be picked, and the prompt information representing a prompt manner of a prompt apparatus corresponding to the commodity indicated by the commodity information,
wherein the order-picking task includes a prompt signal identifier, the prompt signal identifier representing a prompt manner of the prompt signal such that the prompt apparatus sends a prompt signal consistent with the prompt manner, the prompt manner of the prompt signal including a light prompt, or a sound prompt, or a vibration prompt for the order-picking task,
in response to sending the prompt signal, flashing a light or buzzing a buzzer.

12. The method of claim 11, further comprising:
receiving a commodity identifier; and
indicating that a commodity indicated by a piece of commodity information in the order-picking task has been picked when the input commodity identifier matches the commodity information.

13. The method of claim 12, further comprising:
sending a prompt stop instruction to the prompt apparatus to request the prompt apparatus to stop sending a prompt signal consistent with the prompt manner.

14. The method of claim 13, wherein:
the order-picking terminal and the prompt apparatus include a near field communication module; and
the sending the prompt stop instruction to the prompt apparatus includes:
receiving an input on a touch screen of the order-picking terminal to send the prompt stop instruction to the near field communication module of the prompt apparatus by using a near field communication module of the order-picking terminal.

15. An electronic price tag comprising:
one or more processors; and
one or more memories storing thereon computer-readable instructions that, when executed by the one or more processors, cause the one or more processors to perform acts comprising:
receiving a notification instruction, the notification instruction including a commodity identifier;
sending a prompt signal to indicate a location of a commodity corresponding to the commodity identifier,
wherein the notification instruction further includes a prompt signal identifier, the prompt signal identifier representing a prompt manner of the prompt signal such that the electronic price tag sends a prompt signal consistent with the prompt manner, the prompt signal including a light prompt, a sound prompt, or a vibration prompt; and
flashing the light prompt or buzzing a buzzer.

16. The electronic price tag of claim 15, wherein:
the sending the prompt signal includes sending the prompt signal consistent with the prompt manner.

17. The electronic price tag of claim 15, wherein the acts further comprise:
receiving a prompt stop instruction; and
stopping sending the prompt signal.

\* \* \* \* \*